United States Patent
Rasheed et al.

(10) Patent No.: US 12,159,467 B1
(45) Date of Patent: Dec. 3, 2024

(54) CAMERA AND SENSOR SYSTEM FOR MEASUREMENT OF ROAD SURFACE DEFLECTION

(71) Applicants: Novateur Research Solutions, Ashburn, VA (US); Board of Regents, The University of Texas System, Austin, TX (US)

(72) Inventors: Zeeshan Rasheed, Ashburn, VA (US); Khurram Hassan-Shafique, Ashburn, VA (US); Maoxu Li, Ashburn, VA (US); Nicholas Raphael Gans, Plano, TX (US); Cody Lee Lundberg, Burleson, TX (US); Michael Edward Araujo, Euless, TX (US)

(73) Assignees: Novateur Reserch Solutions, Ashburn, VA (US); Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/768,725

(22) Filed: Jul. 10, 2024

(51) Int. Cl.
  *G06V 20/56* (2022.01)
  *G06T 17/00* (2006.01)
(52) U.S. Cl.
  CPC .......... *G06V 20/588* (2022.01); *G06T 17/00* (2013.01)

(58) Field of Classification Search
  None
  See application file for complete search history.

(56) References Cited

FOREIGN PATENT DOCUMENTS

JP  2022123715 A  *  8/2022

* cited by examiner

Primary Examiner — Christopher Braniff
(74) Attorney, Agent, or Firm — Rahman LLC

(57) ABSTRACT

A system for measuring surface deflection of a road includes a first stereo line-scan camera pair on a sensor rig and for capturing a first set of 3D images of a road surface; a second stereo line-scan camera pair on the sensor rig and for capturing a second set of 3D images of the road surface; at least one digital electro-optical (EO) camera rigidly attached to the sensor rig; an inertial measurement unit (IMU) detecting inertial forces acting upon the sensor rig; and a processor compensating for acceleration and vibration effects upon the sensor rig; and calculating the surface deflection of the road based on the first and second sets of 3D images. The processor utilizes imagery from the EO camera and inertial measurements from the IMU to produce 2D mosaics and 3D reconstructions of the road surface from the first and second sets of 3D images.

20 Claims, 23 Drawing Sheets

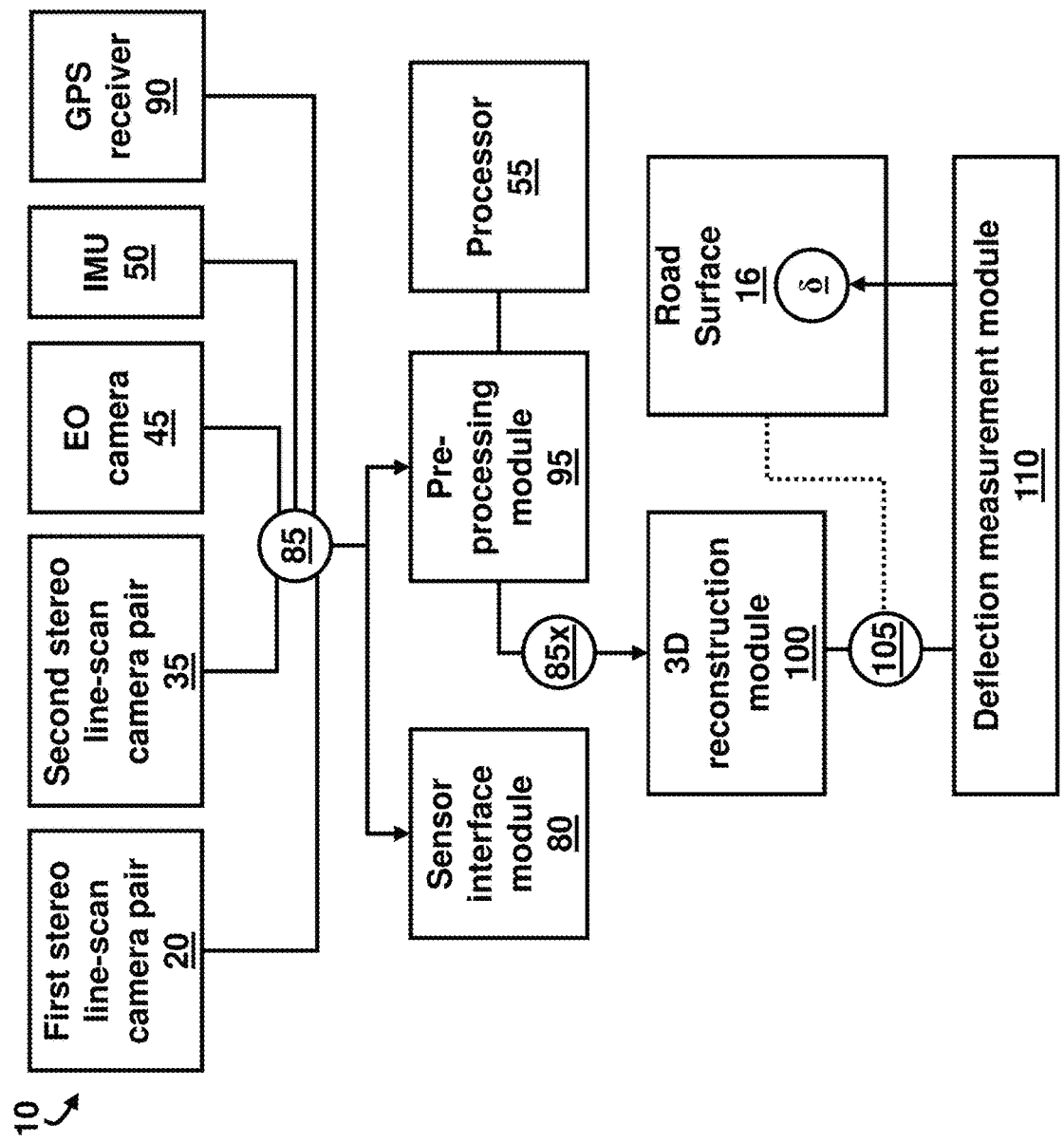
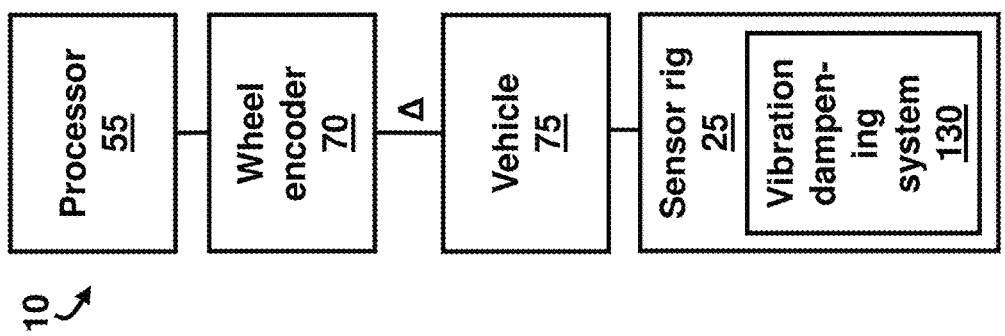

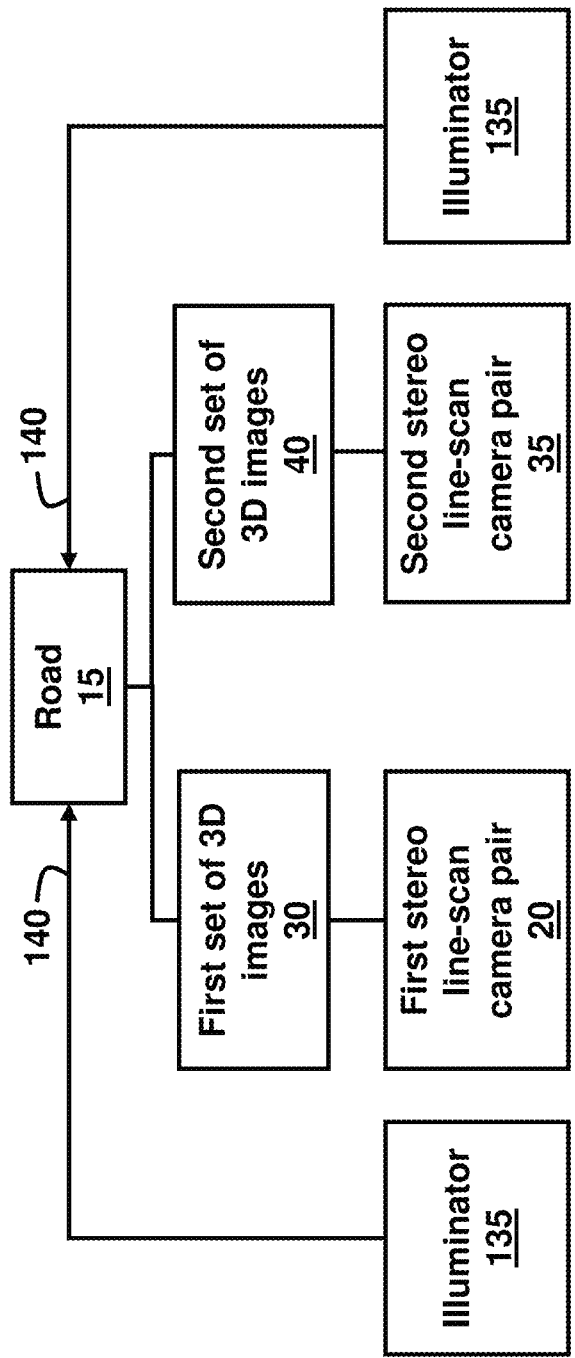

FIG. 7F

252 — Performing point cloud registration using the synchronized pose data to align the generated point cloud

254 — Storing the raw sensor data and the processed sensor data using a data recorder

256 — Managing system settings and parameters for the sensor interface module, the pre-processing module, and the 3D reconstruction module using a configuration manager

200

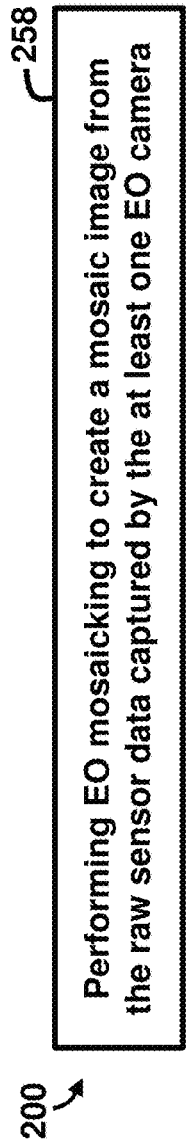

FIG. 7I

Performing EO mosaicking to create a mosaic image from the raw sensor data captured by the at least one EO camera — 258

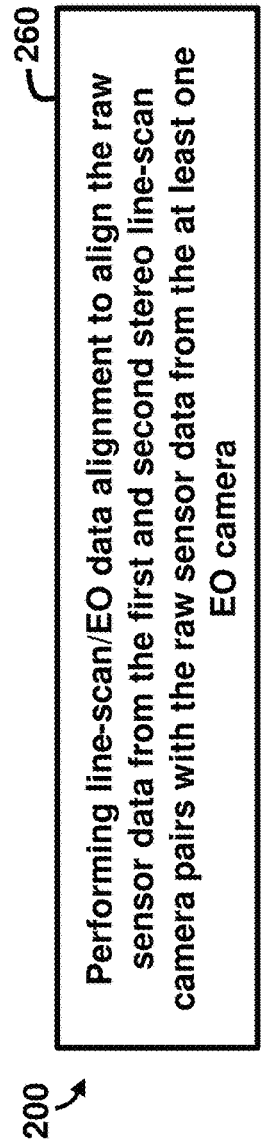

FIG. 7J

Performing line-scan/EO data alignment to align the raw sensor data from the first and second stereo line-scan camera pairs with the raw sensor data from the at least one EO camera — 260

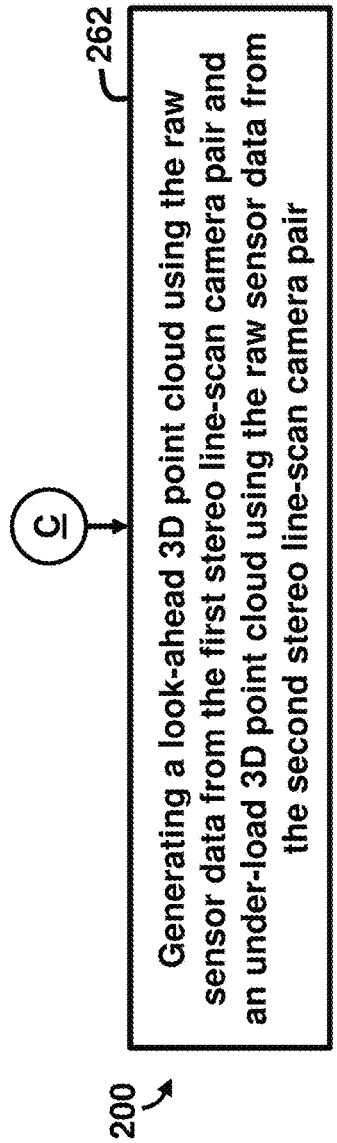

FIG. 7K

Generating a look-ahead 3D point cloud using the raw sensor data from the first stereo line-scan camera pair and an under-load 3D point cloud using the raw sensor data from the second stereo line-scan camera pair — 262

FIG. 17

| Number | A | B | Binary | Direction |
|--------|---|---|--------|-----------|
| 0 | 0 | 0 | 0000 | 0 |
| 1 | 0 | 1 | 0001 | -1 |
| 2 | 1 | 0 | 0010 | +1 |
| 3 | 1 | 1 | 0011 | 0 |
| 4 | 0 | 0 | 0100 | +1 |
| 5 | 0 | 1 | 0101 | 0 |
| 6 | 1 | 0 | 0110 | 0 |
| 7 | 1 | 1 | 0111 | -1 |
| 8 | 0 | 0 | 1000 | -1 |
| 9 | 0 | 1 | 1001 | 0 |
| 10 | 1 | 0 | 1010 | 0 |
| 11 | 1 | 1 | 1011 | +1 |
| 12 | 0 | 0 | 1100 | 0 |
| 13 | 0 | 1 | 1101 | +1 |
| 14 | 1 | 0 | 1110 | -1 |
| 15 | 1 | 1 | 1111 | 0 |

CAMERA AND SENSOR SYSTEM FOR MEASUREMENT OF ROAD SURFACE DEFLECTION

GOVERNMENT INTEREST

Aspects of the invention described herein were developed through support under United States Army contract no. W912HZ22C0023. The U.S. government may have certain rights in this invention.

BACKGROUND

Technical Field

The embodiments herein generally relate to road load testing and road health monitoring, and more particularly to testing and measurement of road deformations and road surface deflection including those caused by loads upon the road.

Description of the Related Art

This background description includes information that may be useful in understanding the present invention. It is not an admission that any of the information provided herein is prior art or relevant to the presently claimed invention or that any publication specifically or implicitly referenced is prior art.

Conventional design and evaluation practices for heavy vehicles as well as contingency infrastructure employ linear elastic analysis to evaluate stresses and strains induced by loadings on the infrastructure. However, linear elastic analysis generally neglects several important factors that play a critical role in surface response and performance. These include viscoelastic properties of the surface as well as the dynamic effect of vehicle-road interaction on the exerted loads on the surface. As a result, these analysis techniques are unable to predict several pavement distress modes observed in the field, for example, top-down cracking and permanent deformation. Modeling these effects requires the use of novel finite element models (FEMs) with accurate 3D geometry and realistic surface behavior. However, despite significant research over the last few years, existing methods of measuring realistic surface behavior and the dynamic vehicle-surface interaction are either i) inefficient, ii) not sufficiently accurate, iii) require significant user intervention, or iv) prohibitively expensive.

The current state-of-practice of surface deflection measurements can be characterized into two broad categories. (1) Falling weight deflectometers (FWDs) approaches apply a pulse load to pavement surface, such as a 300 mm diameter steel plate simulating the magnitude and duration of single heavy moving wheel load. The deflection is measured using geophone sensors placed at specific distances from the load as shown in FIG. 1A. While highly accurate, FWDs are not time efficient and cause delays when used on public infrastructures. (2) Rolling Weight Deflectometers (RWDs) address this limitation by employing laser ranging to measure the distance to the pavement surface at the wheels and various points (FIG. 1B) along the vehicle body (e.g. every 8 feet along the body). The surface deflection can then be calculated from the laser range readings. RWDs offer very accurate measurements (resolution of around 0.02 mm and <0.2% error in deflection measurement) and dense samplings along the road. They also do not require the road to be shut down or the assistance of work crews. However, RWDs still have several downsides: (i) RWDs are very expensive systems (with costs exceeding $1M); (ii) They require the use of special tractor-trailers and cannot be fitted onto a variety of vehicles; (iii) The 1-dimensional measurements, due to the (typical) use of spot-lasers, do not provide detailed visualizations and cannot be accurately registered with historic data for longitudinal analysis. Therefore, there is a strong need to develop cost-efficient systems that can measure vehicle-surface interaction, automatically, efficiently, and with very high precision.

SUMMARY

In view of the foregoing, an embodiment herein provides a system for measuring surface deflection of a road, the system comprising a first stereo line-scan camera pair mounted on a sensor rig, wherein the first stereo line-scan camera pair captures a first set of 3D images of a road surface; a second stereo line-scan camera pair mounted on the sensor rig, wherein the second stereo line-scan camera pair captures a second set of 3D images of the road surface, and wherein the second stereo line-scan camera pair is positioned at a predetermined distance from the first stereo line-scan camera pair; at least one digital electro-optical (EO) camera that generates images and is rigidly attached to the sensor rig; an inertial measurement unit (IMU) to detect inertial forces acting upon the sensor rig; and a processor to: compensate for acceleration and vibration effects upon the sensor rig, wherein the processor utilizes imagery from the EO camera and inertial measurements from the IMU to produce 2D mosaics and 3D reconstructions of the road surface from the first and second sets of 3D images; and calculate the surface deflection of the road based on the first and second sets of 3D images. These sets of 3D images may provide the user with information of road surface stress, deflection, and material health.

The system may further comprise a wheel encoder that measures displacement of a vehicle on which the sensor rig is mounted, wherein the processor is to compensate for vehicle displacement using measurements from the wheel encoder. The system may further comprise a sensor interface module that receives raw sensor data from the first and second stereo line-scan camera pairs, the at least one EO camera, the IMU, and a GPS receiver; a pre-processing module that performs data processing on the raw sensor data using the processor; a 3D reconstruction module that extracts a 3D representation of the road surface from the processed sensor data; and a deflection measurement module that calculates the surface deflection based on the 3D representation.

The system may further comprise a data synchronization module that synchronizes the raw sensor data received by the sensor interface module; and a visualization module that generates visualizations of the 3D representation of the road surface and the calculated surface deflection. The system may further comprise a user interface that outputs the visualizations of the 3D representation of the road surface and the calculated surface deflection. The sensor rig may comprise a vibration dampening system. The system may further comprise a pair of illuminators that provide focused beams of light for the first and second stereo line-scan camera pairs to capture images of the road.

Another embodiment provides a method for measuring surface deflection of a road, the method comprising positioning a first stereo line-scan camera pair to capture a first set of 3D images of a road surface without a load thereon; positioning a second stereo line-scan camera pair at a distance from the first stereo line-scan camera pair to capture a second set of 3D images of the road surface with a load thereon; capturing imagery of the road surface with at least one digital EO camera rigidly attached to the sensor rig; measuring inertial data with an IMU; compensating for acceleration and vibration effects using the imagery from the EO camera and the inertial data from the IMU to produce 2D mosaics and 3D reconstructions of the road surface from the first and second sets of 3D images; and calculating the surface deflection of the road based on the first set of 3D images without the load and the second set of 3D images with the load.

The method may further comprise receiving raw sensor data from the first and second stereo line-scan camera pairs, the at least one EO camera, the IMU, and a GPS receiver; performing data processing on the raw sensor data; extracting a 3D representation of the road surface from processed sensor data; and calculating the surface deflection based on the 3D representation. In the method, the performing of data processing on the raw sensor data may comprise performing image correction on the raw sensor data from the first and second stereo line-scan camera pairs and the at least one EO camera; performing image rectification on the corrected sensor data; and performing depth estimation using the rectified sensor data to generate a set of depth maps.

In the method, the extracting of the 3D representation of the road surface may comprise performing point cloud generation using the set of depth maps; performing point cloud filtering on the generated point cloud; and performing surface reconstruction using the filtered point cloud to generate the 3D representation of the road surface. The method may further comprise performing sensor fusion using the raw sensor data from the IMU and the GPS receiver to generate synchronized pose data. The method may further comprise performing point cloud registration using the synchronized pose data to align the generated point cloud. The method may further comprise storing the raw sensor data and the processed sensor data using a data recorder. The method may further comprise managing system settings and parameters for the sensor interface module, the pre-processing module, and the 3D reconstruction module using a configuration manager.

The method may further comprise performing EO mosaicking to create a mosaic image from the raw sensor data captured by the at least one EO camera. The method may further comprise performing line-scan/EO data alignment to align the raw sensor data from the first and second stereo line-scan camera pairs with the raw sensor data from the at least one EO camera. In the method, the extracting of the 3D representation of the road surface may comprise generating a look-ahead 3D point cloud using the raw sensor data from the first stereo line-scan camera pair and an under-load 3D point cloud using the raw sensor data from the second stereo line-scan camera pair. The method may further comprise estimating stress on the road surface based on the look-ahead 3D point cloud and the under-load 3D point cloud. The method may further comprise generating electric pulses based on rotation of a wheel positioned on the road using a wheel encoder; detecting rising and falling edges of the pulses generated by outputs of the wheel encoder; determining a direction of motion of the wheel based on the detected rising and falling edges of the pulses; and triggering the first and second stereo line-scan camera pairs to capture the first and second sets of 3D images based on the detected rising and falling edges of the pulses.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 is a block diagram illustrating using a wheel encoder to measure displacement of a vehicle with the system of FIG. 2, according to an embodiment herein;

FIG. 4 is a block diagram illustrating various modules used with the system of FIGS. 2-3, according to an embodiment herein;

FIG. 6 is a block diagram illustrating using illuminators with the system of FIGS. 2-5, according to an embodiment herein;

FIGS. 7A-7M are flow diagrams illustrating a method for measure the surface deflection of a road, according to the embodiments herein;

FIG. 17 is a chart illustrating motion direction estimation using the edges of the signals from the wheel encoder, according to an embodiment herein;

Figure 1A:
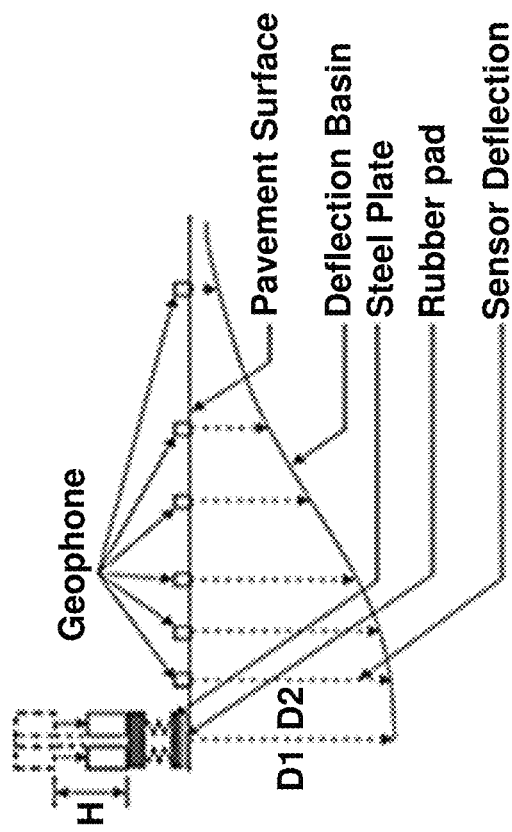
FIG. 1A is a diagram illustrating measurement of surface deflection using a trailer-mounted FWD.
Figure 1B:
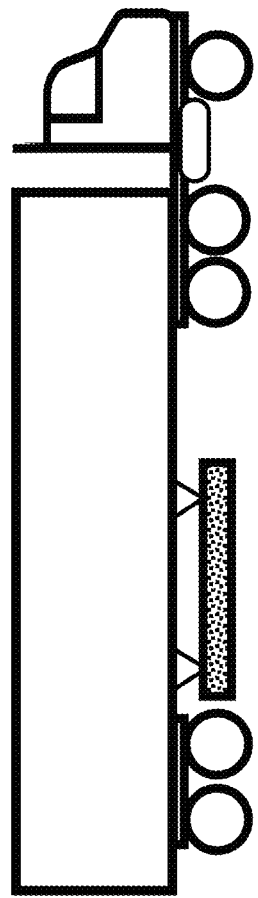
FIG. 1B is a schematic diagram illustrating a RWD system with a wheel-mounted laser ranging sensor on a truck.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments herein provide a system and method for measuring surface deflection of a road utilizing a stereo line-scan camera system with a digital EO camera rigidly attached to the stereo rig. The system utilizes the stereo line-scan cameras to overcome the limitations of conventional RWD systems. The imagery from the EO camera along with the IMU data enables the system to compensate for the acceleration and vibration effects and help produce highly accurate 2D mosaics and 3D reconstructions from the stereo color line-scan cameras. The system generates an accurate 3D reconstruction of the road surface by using two sets of stereo line-scan camera systems and EO cameras to independently generate 3D surfaces with and without load and measure surface deflection due to the load. The system also uses a wheel encoder to accurately measure and compensate for the vehicle displacement. Referring now to the drawings, and more particularly to FIGS. 2 through 19, where similar reference characters denote corresponding features consistently throughout the figures, there are shown preferred embodiments. In the drawings, the size and relative sizes of components, layers, and regions, etc. may be exaggerated for clarity.

In some examples, the processor 55 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a RF switch, antenna tuner, comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the system 10 and associated components. In some examples, the processor 55 may comprise a central processing unit (CPU) of the system 10. In other examples the processor 55 may be a discrete component independent of other processing components in the system 10. In other examples, the processor 55 may be a semiconductor-based microprocessor, microcontroller, field-programmable gate array (FPGA), hardware engine, hardware pipeline, and/or other hardware-enabled device suitable for receiving, processing, operating, and performing various functions for the system 10. The processor 55 may be provided in the system 10, coupled to the system 10, or communicatively linked to the system 10 from a remote networked location, according to various examples.

The system 10 may be embodied as an electronic device according to an example. For example, the system 10 as embodied as an electronic device may comprise any suitable type of communication device capable of transceiving data. In other examples, system 10 as embodied as an electronic device may comprise a computer, all-in-one (AIO) device, laptop, notebook computer, tablet device, mobile phone, smartphone, electronic book reader, appliance, gaming system, electronic toy, web-based server, local area network server, cloud-based server, etc., among other types of electronic devices that communicate with another device wirelessly.

Furthermore, in some examples, the system 10 may comprise various controllers, switches, processors, modules, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a preconfigured set of instructions, which when performed, may result in actions as stated in conjunction with the methods described above. In an example, the preconfigured set of instructions may be stored on a tangible non-transitory computer readable medium or a program storage device containing software code.

Figure 2:
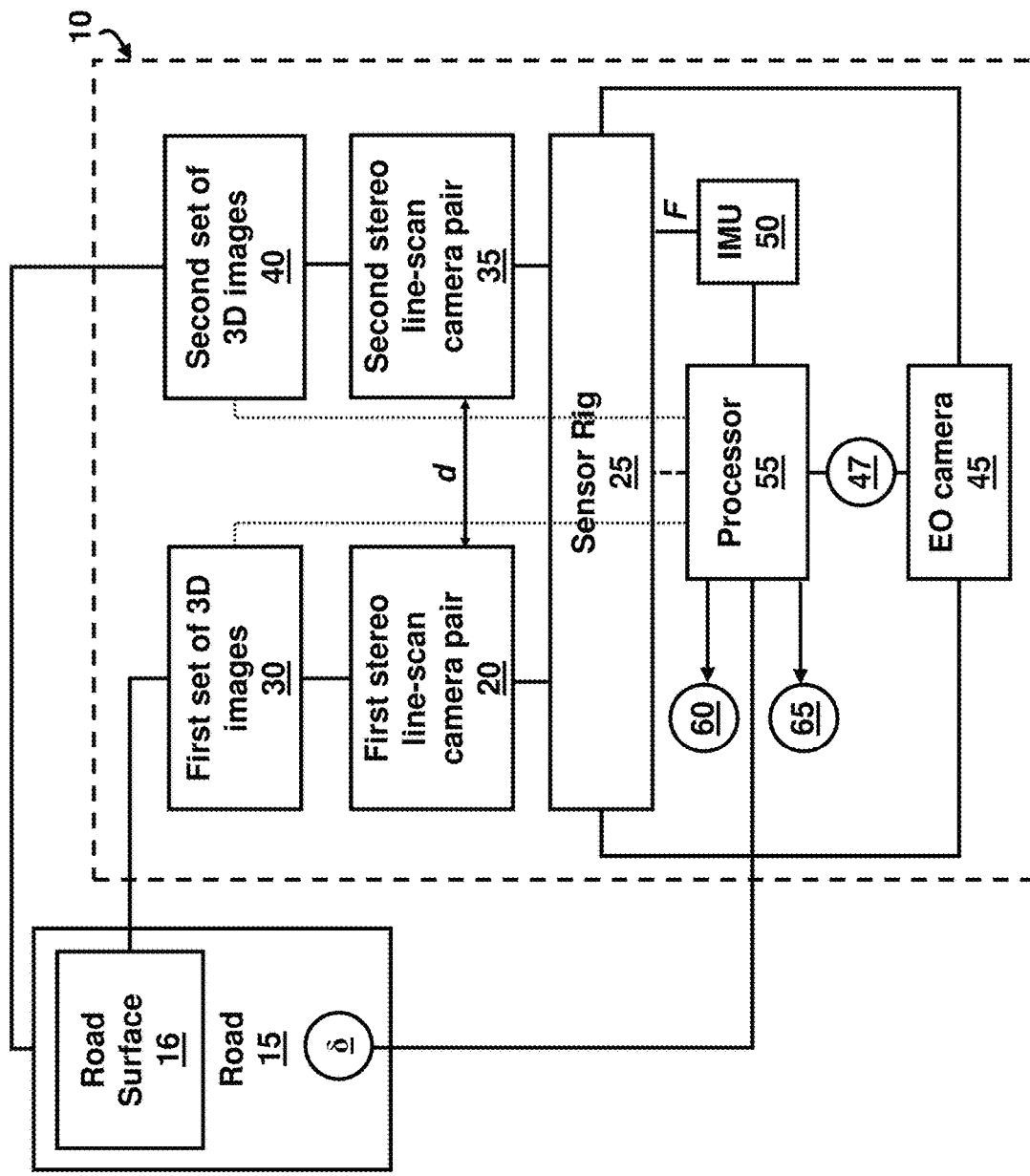
FIG. 2 is a block diagram illustrating a system for measuring the surface deflection of a road, according to an embodiment herein.

FIG. 2 is a block diagram illustrating a system 10 for measuring surface deflection δ of a road 15, the system 10 comprising a first stereo line-scan camera pair 20 mounted on a sensor rig 25, wherein the first stereo line-scan camera pair 20 captures a first set of 3D images 30 of a road surface 16; a second stereo line-scan camera pair 35 mounted on the sensor rig 25, wherein the second stereo line-scan camera pair 35 captures a second set of 3D images 40 of the road surface 16, and wherein the second stereo line-scan camera pair 35 is positioned at a predetermined distance d from the first stereo line-scan camera pair 20; at least one digital electro-optical (EO) camera 45 that generates images 47 and is rigidly attached to the sensor rig 25; an inertial measurement unit (IMU) 50 to detect inertial forces F acting upon the sensor rig 25; and a processor 55 to: (i) compensate for acceleration and vibration effects upon the sensor rig 25, wherein the processor 55 utilizes imagery 47 from the EO camera 45 and inertial measurements from the IMU 50 to produce 2D mosaics 60 and 3D reconstructions 65 of the road surface 16 from the first and second sets of 3D images 30, 40; and (ii) calculate the surface deflection δ of the road 15 based on the first and second sets of 3D images 30, 40.

The first stereo line-scan camera pair 20 is mounted on the sensor rig 25. This camera pair 20 captures the first set of 3D images 30 of the road surface 16. Line-scan cameras operate by capturing a single line of pixels at a time, building up a 2D image as the camera or object moves. By using two line-scan cameras in a stereo configuration, the system 10 can capture 3D depth information about the road surface 16. The high resolution and frame rate of line-scan cameras enable detailed 3D capture even while a vehicle is moving at significant speeds.

The second stereo line-scan camera pair 35 is also mounted on the sensor rig 25, positioned at a predetermined distance d from the first camera pair 20. This second camera pair 35 captures a second set of 3D images 40 of the same road surface 16. By comparing the 3D geometry captured by the two camera pairs 20, 35, the system 10 can measure the deflection δ of the road surface 16 caused by the load of a vehicle.

To assist in processing the line-scan imagery 30, 40, the system 10 includes at least one digital EO camera 45 rigidly attached to the sensor rig 25. This camera 45 provides an additional view of the road 15 to aid in compensating for vehicle motion and vibration. The IMU 50 is used to detect inertial forces F acting upon the sensor rig 25. The IMU 50 provides important data about the motion and orientation of the cameras 20, 35 to help process the imagery 30, 40, 47.

The processor 55, which may be locally or remotely connected to sensor rig 25, compensates for acceleration and vibration effects upon the sensor rig 25 by utilizing imagery 47 from the EO camera 45 and inertial force F measurements from the IMU 50. This allows the processor 55 to accurately produce 2D mosaics 60 and 3D reconstructions 65 of the road surface 16 from the line-scan imagery 30, 40, even in the presence of vehicle motion. Additionally, the processor 55 calculates the surface deflection δ of the road 15 by comparing the 3D geometry captured in the first and second sets of 3D images 30, 40 from the two line-scan camera pairs 20, 35.

The use of two stereo line-scan camera pairs 20, 35 at a fixed offset distance d is innovative compared to typical line-scan imaging because it allows the system 10 to capture the deformation of the road surface 16 caused by the vehicle's load. The specific configuration of cameras 20, 35, 45 and sensors, and the processing to compensate for vehicle motion, enable an accurate measurement of road deflection δ in a moving vehicle. This improves on existing road deflection measurement techniques that require bringing a vehicle to a stop, such as FWDs.

In an example, the sensor rig 25 houses and maintains proper positioning and orientation of the various sensors used to capture data for measuring road surface deflection δ. The sensor rig 25 may be configured to be modular and adaptable to mount on a variety of heavy vehicles. The main structure of the sensor rig 25 comprises a sturdy frame that rigidly connects the first and second stereo line-scan camera pairs 20, 35, the digital EO camera(s) 45, and the IMU 50. This rigid connection helps to maintain the fixed geometric relationships between the sensors, which is necessary for accurate data fusion and processing.

The stereo line-scan camera pairs 20, 35 are mounted at a predetermined distance d from each other and this distance d may be selected based on the expected deflection of the road surface 16 under load, the field of view of the cameras 20, 35, 45, and the desired resolution of the deflection measurement. In an example, the cameras 20, 35 may be mounted with their scan lines perpendicular to the direction of travel, so that each frame captures a transverse section of the road surface 16. According to an embodiment, the EO camera(s) 45 are rigidly mounted to the frame of the sensor rig 25 in a position that provides a good, and preferably unobstructed view of the road surface 16 and any visible reference points that can aid in motion compensation. The IMU 50 is also rigidly attached to the frame of the sensor rig 25, as close as possible to the cameras 20, 35, 45 to accurately measure the motion and detect the inertial forces F acting upon the sensor rig 25.

Another aspect of the sensor rig 25 is the ability to adjust the positioning and orientation of the sensors. Fine adjustments can be utilized to ensure proper alignment of the stereo camera pairs 20, 35 and to account for any slight variations in mounting on different vehicles. According to an example, this may be accomplished through the use of precision adjustment mechanisms built into the mounting hardware for each sensor. Moreover, the sensor rig 25 may provide protection for the sensors from environmental elements, especially dust, moisture, and impacts from small debris as the vehicle moves. This may involve sealed enclosures for the sensors with transparent windows for the cameras 20, 35, 45, according to an example. These enclosures may be configured to not interfere with the operation of the sensors while still providing adequate protection from the environment. Accordingly, the sensor rig 25 may be configured as a mechanical structure that provides a stable, protected platform for the various sensors used in the road deflection measurement system 10. The sensor rig 25 may be configured to account for the specific requirements of the sensors, the characteristics of the vehicles it will be mounted on, and the harsh environment in which it will operate.

The first and second stereo line-scan camera pairs 20, 35 are the primary sensors used in the system 10 for capturing the 3D geometry of the road surface 16. Each camera pair 20, 35 is mounted a fixed distance d apart, allowing the cameras 20, 35 to capture stereoscopic imagery 30, 40 of the road 15. The line-scan cameras 20, 35 are specialized imaging devices that capture a single line of pixels at a time, rather than a full 2D image like a traditional camera. The camera pairs 20, 35 may be configured to operate in a "pushbroom" configuration, where each camera pair 20, 35 is moved perpendicular to the scan line (or the object is moved past the camera). As the cameras 20, 35 move, they capture a series of scan lines, which can be stitched together to form a complete 2D image. The resolution of the final image is determined by the number of pixels in each scan line and the distance moved between each scan line.

In the system 10, the line-scan cameras 20, 35 may be oriented with their scan lines perpendicular to the direction of travel. As the vehicle moves forward, the cameras 20, 35 capture a series of transverse profiles of the road surface 16. The use of two line-scan cameras 20, 35 in a stereo configuration allows the system 10 to capture 3D information about the road surface 16. By analyzing the disparity (difference in position) of features between the left and right camera images, the system 10 can compute the depth of those features. This process, known as stereoscopic depth estimation, produces a 3D point cloud or depth map of the road surface 16. According to non-limiting examples, the cameras 20, 35 may have very high scan line rates (e.g., 10-100 kHz) and high pixel counts per line (e.g., 2048-8192 pixels). Furthermore, the cameras 20, 35 may also have features like precise clock synchronization to enable accurate stereo depth estimation.

The first stereo line-scan camera pair 20 is positioned to capture the road surface 16 in an unloaded state; i.e., ahead of the vehicle's wheels. The second camera pair 35 is positioned a fixed distance d behind the first pair of cameras 20, such that the second camera pair 35 captures the road surface 16 under load from the vehicle's wheels. By comparing the 3D geometry captured by the two camera pairs 20, 35, the system 10 can directly measure the deflection δ of the road surface 16 caused by the vehicle's load. The distance d between the two camera pairs 20, 35 is preferably sufficiently large enough to allow measurable deflection δ of the road surface 16 to occur, but not so large that the two camera pairs 20, 35 are seeing entirely different sections of road 16. The optimal distance d will depend on factors like the expected stiffness of the road surface 16, the weight and speed of the vehicle, and the desired resolution and accuracy of the deflection measurement. In an example, the distance d may be between 0.5-3 m. In another example, the distance d may be between 0.5-1.5 m. As long as the vehicle is traveling in a substantially straight line, the distance d between the camera pairs 20, 35 is not critical. However, a very large distance d (such as over 3 m) can cause the sensor rig 25 to twist which becomes a problem. Therefore, it is preferable that the distance d is less than 3 m.

The first set of 3D images 30 and the second set of 3D images 40 are the primary data products generated by the stereo line-scan camera pairs 20, 35 in the system 10. These images 30, 40 capture the 3D geometry of the road surface 16 in an unloaded and loaded state, respectively, and form the basis for the deflection measurement δ. Each set of 3D images 30, 40 may be generated through a process called stereoscopic depth estimation, for example. This process relies on the principle of binocular disparity—the slight difference in the appearance of a scene when viewed from two different positions. In the system 10, the two line-scan cameras in each camera pair 20, 35 may be mounted a fixed distance apart, also referred to herein as the stereo baseline. As the vehicle moves and the cameras 20, 35 scan the road surface 16, the cameras 20, 35 capture two slightly different views of the scene.

In an example, the first step in generating the 3D images 30, 40 is to rectify the raw line-scan imagery. Rectification is a geometric transformation that aligns the left and right images so that corresponding points lie on the same scan lines. This simplifies the subsequent depth estimation process. The rectification parameters are determined through a calibration process that is performed when the cameras 20, 35 are initially set up. After rectification, the processor 55 performs pixel-wise matching between the left and right images. For each pixel in the left image, the processor 55 searches for the corresponding pixel in the right image. The difference in the horizontal positions of these pixels, known as the disparity, is inversely proportional to the depth of the point in the scene. Points that are closer to the cameras 20, 35 will have a larger disparity than points that are farther away. The disparity calculation is a computationally intensive process, as it involves searching for matches across a range of possible disparities for each pixel. To speed up this process, the system 10 may employ specialized hardware, such as a graphics processing unit (GPU), which can perform these calculations in parallel. Once the disparities have been computed, they can be converted into actual depth measurements using the known geometry of the stereo camera setup. This results in a dense 3D point cloud or depth map where each pixel in the original line-scan image is associated with a 3D position.

In an example, the first set of 3D images 30 is generated by the first stereo line-scan camera pair 20, which is positioned to scan the road surface 16 ahead of the vehicle's wheels. These images capture the baseline, unloaded geometry of the road 15. The second set of 3D images 40 is generated by the second camera pair 35, which may scan the road surface 16 a fixed distance d behind the first pair of cameras 20, under the load of the vehicle's wheels. The difference between these two sets of images 30, 40 represents the deflection δ of the road surface 16 due to the applied load. However, before the deflection δ can be accurately measured, the 3D images 30, 40 preferably undergo further processing. One step in the processing is motion compensation, which corrects for any movement or vibration of the sensor rig 25 during the scan. This is where the data from the EO camera 45 and IMU 50 are utilized. The processor 55 may use visual-inertial odometry techniques to estimate the pose or orientation of the sensor rig 25 at each moment and applies these poses to transform the 3D images 30, 40 into a consistent, motion-compensated coordinate frame. Additional post-processing steps may include noise reduction, surface smoothing, and data compression. The end result is a pair of high-resolution, 3D representations of the road surface 16 in unloaded and loaded states, ready for deflection analysis.

The EO camera 45 may serve as a complementary sensor to the stereo line-scan camera pairs 20, 35 in the system 10. While the line-scan cameras 20, 35 capture high-resolution 3D geometry of the road surface 16, the EO camera 45 provides a wider-angle, 2D view of the scene. This additional perspective is helpful for compensating for the effects of vehicle motion and vibration on the line-scan imagery 30, 40. The EO camera 45 may be configured as a digital camera that captures a full 2D image of the scene (i.e., road 15) in a single exposure. The EO camera 45 is rigidly mounted to the same sensor rig 25 as the line-scan cameras 20, 35, ensuring that the EO camera 45 maintains a fixed geometric relationship to the other cameras 20, 35. The EO camera 45 may be oriented to provide a clear view of the road surface 16 and any surrounding features that may be useful for motion compensation, such as lane markings, road signs, or buildings, etc. The specific type of EO camera 45 used in the system 10 may depend on the requirements of the application such as the desired resolution (pixel count), frame rate, lens field of view, and sensitivity. For motion compensation purposes, a higher frame rate is generally desirable, as it allows the system 10 to track features more smoothly between frames. A wide field of view is also beneficial, as it increases the likelihood of capturing useful reference features. According to some examples, there may be multiple EO cameras(s) 45 with overlapping fields of view. This can provide additional redundancy and robustness for feature tracking, as well as enabling the use of techniques like structure-from-motion (SfM) for additional motion estimation.

The imagery 47 from the EO camera 45 may be processed in conjunction with the inertial measurements from the IMU 50 to estimate the motion of the sensor rig 25. This process, known as visual-inertial odometry (VIO), may track the movement of features in the EO imagery 47 over time and combines this information with the data from the IMU 50 to estimate the 6-degree-of-freedom (6 DoF) pose or orientation of the sensor rig 25. By knowing the precise pose or orientation of the sensor rig 25 at each moment, the system 10 can correct for any motion-induced distortions or misalignments in the line-scan imagery 30, 40.

The EO camera 45 also plays a role in generating the 2D mosaics 60 of the road surface 16. These 2D mosaics 60 are created by stitching together multiple line-scan images into a single, coherent 2D image. The EO imagery 47 provides a reference for this stitching process, helping to ensure that the line-scan images are correctly aligned and scaled. Moreover, the EO camera imagery 47 also serves as a useful visual reference for the operators of the system 10 as the EO camera 45 may provide a human-interpretable view of the road surface 16 and surrounding environment of the road 15, which can be valuable for troubleshooting, quality control, and data interpretation.

In an embodiment, the IMU 50 measures the motion and orientation of the sensor rig 25. The IMU 50 detects the inertial forces F acting upon the sensor rig 25, which include both the acceleration due to the vehicle's movement and the gravitational acceleration. This information is utilized for compensating for the effects of vehicle motion and vibration on the line-scan imagery 30, 40. According to an example, the IMU 50 may comprise multiple components including accelerometers, gyroscopes, and magnetometers (not shown). The accelerometers measure linear acceleration along three orthogonal axes (X, Y, Z). They work by detecting the displacement of a small proof mass under acceleration, using mechanisms like capacitive sensing or piezoelectric effects. Gyroscopes, on the other hand, measure angular velocity around the three axes. They operate based on principles like the Coriolis effect, which causes a vibrating object to experience a force when rotated. Magnetometers measure the local magnetic field, providing a reference for absolute orientation.

In the system 10, the IMU 50 is rigidly attached to the sensor rig 25, as close as possible to the center of the line-scan and EO cameras 20, 35, 45. This positioning may help to minimize the effects of rotational motion on the measurements. The IMU 50 may also be calibrated to align its measurement axes with the axes of the cameras 20, 35, 45. According to an example, the IMU 50 may operate at a high sampling rate, perhaps hundreds or even thousands of Hz, to capture high-frequency vibrations and rapid movements. At each sampling instant, the IMU 50 may output a six-dimensional vector comprising of three linear accelerations and three angular velocities. In another example, the IMU 50 may also output a nine-dimensional vector that includes the three magnetic field measurements.

The raw IMU data undergoes several stages of processing to convert it into useful motion estimates. First, the raw sensor readings are corrected for factors like bias, scale factor errors, and non-orthogonality of the measurement axes. These corrections are based on parameters determined through factory calibration or in-field calibration procedures. Next, the corrected accelerations and angular velocities are integrated over time to estimate the change in velocity, position, and orientation of the sensor rig 25. This process, known as dead reckoning, provides an estimate of the motion of the sensor rig 25 relative to its starting point. However, due to sensor noise and bias drift, these estimates can quickly accumulate errors over time. To mitigate these errors, the IMU data may be fused with other sources of motion information, such as the visual odometry from the EO camera 45. Techniques like the Kalman filter or particle filter can be used to optimally combine these different measurements, leveraging the strengths of each sensor while compensating for their weaknesses. The result is a more accurate and drift-free estimate of the 6 DoF pose of the sensor rig 25 over time.

The motion estimates from the IMU 50 are used by the processor 55 to compensate for the vehicle's movement in the line-scan imagery 30, 40. By knowing the precise pose of the sensor rig 25 at each scan line capture, the processor 55 can warp and align the line-scan images as if they were all captured from a consistent, static viewpoint. This motion compensation is helpful for generating accurate 3D reconstructions 65 and deflection measurements δ.

Detecting the inertial forces F acting upon the sensor rig 25 assists in accurately measuring the road surface deflection δ. In an example, the inertial forces F are those that arise due to the acceleration or deceleration of the sensor rig 25, including both the acceleration due to the vehicle's motion and the ever-present gravitational acceleration. These forces F can be understood through Newton's laws of motion. Newton's first law states that an object at rest stays at rest, and an object in motion stays in motion with the same speed and in the same direction, unless acted upon by an unbalanced force. In the context of the sensor rig 25, this means that any change in the velocity of the sensor rig 25, either in magnitude or direction, must be caused by an external force. Newton's second law quantifies this relationship: the acceleration of an object is directly proportional to the net force acting on it and inversely proportional to its mass. In mathematical terms, $F=ma$, where F is the net force, m is the mass of the object, and a is its acceleration. For the sensor rig 25, this means that the inertial forces F it experiences are directly related to its acceleration.

These inertial forces F can have significant effects on the line-scan imagery 30, 40 captured by the system 10. Consider the first stereo line-scan camera pair 20, which is configured to capture the unloaded road surface 16 ahead of the vehicle's wheels. If the vehicle accelerates or brakes suddenly, the resulting inertial force F will cause the sensor rig 25 to pitch forward or backward. This motion may change the viewing angle and position of the line-scan cameras 20, 35 relative to the road surface 16, thereby distorting the captured imagery 30, 40. Similarly, if the vehicle hits a bump or pothole, the sudden vertical acceleration will cause the sensor rig 25 to jolt upwards. This motion will again alter the position and orientation of the cameras 20, 35, leading to further distortions in the line-scan imagery 30, 40. Even the constant vibration of the vehicle as it travels down the road 15 can introduce small, high-frequency disturbances to the views of the cameras 20, 35. If these motion-induced distortions are not corrected, they will lead to errors in the 3D reconstruction of the road surface 16. The stereoscopic depth estimation process relies on precise knowledge of the relative positions and orientations of the left and right cameras 20, 35.

Furthermore, to accurately measure the road surface deflection δ, the system 10 may compare the 3D geometry captured by the first camera pair 20 (unloaded surface) with that captured by the second pair 35 (loaded surface). If the two sets of imagery 30, 40 are distorted differently due to varying inertial forces at the moments of capture, this comparison will be invalid. This is where the IMU 50 is utilized. By continuously measuring the linear accelerations and angular velocities of the sensor rig 25, the IMU 50 provides the data necessary to estimate the motion and orientation of the sensor rig 25 over time. These motion estimates can then be used to computationally "undo" the distortions in the line-scan imagery 30, 40, bringing all the images into a consistent, motion-compensated coordinate frame. Accordingly, the IMU 50 may allow the system 10 to virtually "stabilize" the line-scan cameras 20,35, as if they were capturing images from a perfectly static and level viewpoint, regardless of the actual motion of the vehicle. This motion compensation is a useful step in generating accurate 3D reconstructions 65 and deflection measurements δ.

The processor 55 assists in compensating for the effects of acceleration and vibration on the sensor rig 25, which helps in generating accurate 2D mosaics 60 and 3D reconstructions 65 of the road surface 16. This compensation process involves a sophisticated fusion of data from the EO camera 45 and the IMU 50, combined with advanced image processing and computer vision techniques. In an example, the first step in the compensation process is to estimate the motion of the sensor rig 25 over time. This may be performed through VIO, which combines the visual information from the EO camera 45 with the inertial measurements F from the IMU 50. The EO camera 45 provides a stream of 2D images that capture the appearance of the road surface 16 and surrounding environment. By tracking the movement of distinct features across these images, the processor 55 can estimate the motion of the EO camera 45 relative to the scene. This may be performed using feature detection and matching algorithms, such as SIFT, SURF, or ORB, followed by robust estimation techniques like RANSAC to reject outliers and compute the optimal camera transformation between frames.

However, visual odometry alone can be prone to drift and errors, especially in scenes with few distinct features or during rapid motions. This is where the IMU data may be utilized. In an example, the IMU 50 provides high-frequency measurements of the linear acceleration and angular velocity of the sensor rig 25, which can be integrated over time to estimate the position, velocity, and orientation of the sensor rig 25. These IMU-based estimates are not affected by visual factors and can thus provide a more robust and drift-resistant estimate of the motion of the sensor rig 25.

According to an example, the processor 55 may fuse the visual and inertial measurements using a probabilistic framework, such as a variant of the Kalman filter or a factor graph optimization. These techniques can model the uncertainty in the different measurements and compute the most likely estimate of the trajectory of the sensor rig 25 given all the available data. The result is a smooth, globally consistent estimate of the 6 DoF pose (position and orientation) of the sensor rig 25 at each moment in time.

With the motion of the sensor rig 25 estimated, the processor 55 can then proceed to compensate for this motion in the line-scan imagery 30, 40. For each line captured by the stereo line-scan cameras 20, 35, the processor 55 may use the estimated pose at that instant to warp the line into a consistent, motion-compensated coordinate frame. This process effectively "undoes" the motion of the sensor rig 25, generating line-scan images that appear as if they were captured from a perfectly static and stable platform. The motion-compensated line-scan images may then be fed into the 3D reconstruction pipeline. In an example, this pipeline first rectifies the stereo line-scan pairs, aligning them for efficient stereo matching. It then computes the disparity (inverse depth) for each pixel using block matching or semi-global matching techniques, for example. Thereafter, the resulting disparity maps may be post-processed to fill in holes and remove noise, and finally converted into 3D point clouds or depth maps using the known stereo camera geometry.

To generate the 2D mosaics 60, the processor 55 may stitch together the motion-compensated line-scan images in the order they were captured. This stitching process leverages the precise pose estimates to ensure that the lines are correctly positioned and aligned in the final mosaic 60. Advanced blending techniques, such as multi-band blending or seam leveling, may be used to create a seamless and visually consistent mosaic 60. For the 3D reconstructions 65, the processor 55 may aggregate the depth maps or point clouds generated from each motion-compensated line-scan pair. The processor 55 may use the pose estimates to transform these 3D primitives into a common, global coordinate system. In some examples, redundant points are merged, outliers are filtered out, and surface reconstruction techniques like Poisson surface reconstruction or Delaunay triangulation may be applied to generate a final, coherent 3D model of the road surface 16.

According to an example, the processor 55 calculates the surface deflection $\delta$ of the road 15 by comparing the 3D geometry captured in the first set of images 30 (unloaded road surface) with that captured in the second set of images 40 (loaded road surface under the vehicle's wheels). This comparison may be performed after the images 30, 40 have been processed through the motion compensation, rectification, and 3D reconstruction pipelines, resulting in two dense, globally consistent 3D models of the road surface 16. According to an example, the first step in the deflection calculation is to align the two 3D models. Although both models are already in a common global coordinate system due to the motion compensation, there may still be small misalignments due to factors like calibration errors, lens distortions, or imperfect pose estimates. To correct for these, the processor 55 may perform a fine registration of the two models using techniques like iterative closest point (ICP) or 3D feature matching, for example. These techniques find the optimal rigid transformation (rotation and translation) that minimizes the distance between corresponding points in the two models.

Once aligned, the processor 55 can directly compare the depth (Z) values of corresponding points in the unloaded and loaded models. In theory, any difference in depth between these points is due to the deflection $\delta$ of the road surface 16 under the vehicle's load. However, in practice, there are several factors that complicate this comparison. First, the road surface 16 may have inherent roughness or texture that causes local variations in depth, even in the absence of load. To mitigate this, the processor 55 may apply smoothing or averaging filters to the depth maps, reducing the influence of high-frequency surface variations. Second, there may be gaps or holes in the 3D models due to factors like occlusions, low texture, or processing artifacts. The processor 55 needs to handle these gaps gracefully, either by interpolating depth values from neighboring points or by excluding them from the deflection calculation, for example. Third, the deflection $\delta$ of the road surface 16 may not be uniform across the entire area captured by the cameras 20, 35, 45. The processor 55 may need to segment the 3D models into smaller regions and calculate the deflection $\delta$ separately for each region. This can provide a more detailed map of the deflection pattern across the road surface 16.

To perform the actual deflection calculation, the processor 55 may sample a dense grid of points from the aligned 3D models. For each point, the processor 55 may compute the depth difference between the unloaded and loaded models. In an example, these depth differences are then converted into actual deflection values using the known scale and geometry of the 3D reconstruction. The processor 55 may also apply statistical techniques to the deflection measurements $\delta$ to improve their robustness and reliability. For example, the processor 55 may compute the median or trimmed mean of the deflection values within each region to reduce the influence of outliers. Furthermore, the processor 55 may also estimate the uncertainty of each deflection measurement $\delta$ based on factors like the local surface roughness, the density of 3D points, and the estimated errors in the motion compensation and 3D reconstruction, for example. Finally, the processor 55 may output the deflection measurements $\delta$ in a suitable format for further analysis and visualization. For example, this may include a 2D deflection map, where the deflection values are color-coded or height-mapped over the road surface 16, and/or a numerical report of the average, maximum, and minimum deflections within each region.

FIG. 3, with reference to FIG. 2, is a block diagram illustrating that the system 10 may further comprise a wheel encoder 70 that measures displacement $\Delta$ of a vehicle 75 on which the sensor rig 25 is mounted. The processor 55 is to compensate for vehicle displacement $\Delta$ using measurements from the wheel encoder 70. In an example, the cameras 20, 35 may be synchronized with the motion of the vehicle 75 using the wheel encoder 70, which provides precise information about the distance traveled by the vehicle 75. This allows the system 10 to maintain a consistent spatial resolution in the captured imagery 30, 40, regardless of the speed of the vehicle 75. According to an example, vehicle 75 may comprise a car, van, truck, or any other type of vehicle that typically travels on a road 15.

In an example, the wheel encoder 70 is a sensor that provides precise information about the rotation of the wheels of the vehicle 75, which can be used to estimate the linear displacement Δ of the vehicle 75 along the road surface 16. According to an example, the wheel encoder 70 may comprise a high-resolution rotary encoder mounted on one of the wheel hubs or drive shafts of the vehicle 75. According to another example, the wheel encoder 70 may be mounted on a small wheel (not shown) the sensor rig 25 or camera frame and is held in contact with the wheel of the vehicle 75. As the wheel of the vehicle 75 turns, it turns the small wheel. Moreover, the wheel encoder 70 may be a pre-existing device on the vehicle 75. In an embodiment, as the wheel rotates, the wheel encoder 70 generates a series of electrical pulses, where each pulse corresponds to a small angular increment of the wheel's rotation. By counting these pulses and multiplying by the known circumference of the wheel, the processor 55 can calculate the linear distance A traveled by the vehicle 75.

The integration of the wheel encoder 70 into the system 10 offers an independent source of displacement information that can be used to validate and refine the motion estimates derived from the VIO process. While VIO is a powerful technique for estimating the motion of the sensor rig 25, it can be subject to drift and errors over long distances, especially in scenarios with poor visual features or high-dynamic motions. The wheel encoder 70, on the other hand, provides a direct, drift-free measurement of the linear displacement Δ of the vehicle 75 that can be used to constrain and correct the VIO estimates. Furthermore, the wheel encoder 70 may enable more precise synchronization between the data captured by the different sensors. For example, the stereo line-scan cameras 20, 35, EO camera 45, and IMU 50 may all operate at different frame rates and with different timing characteristics. Synchronizing these data streams solely based on their timestamps can be challenging, especially in the presence of timing errors or latencies. However, by using the wheel encoder 70 as a common trigger source, the processor 55 can ensure that all sensors capture data at precisely known positions along the trajectory of the vehicle 75. This spatial synchronization is helpful for accurate motion compensation and 3D reconstruction 65.

In an example, to utilize the wheel encoder data, the processor 55 may convert the raw encoder pulses into a displacement estimate, taking into account factors like the wheel circumference, gear ratios, and any nonlinearities or slip in the wheel-road interface. This may involve applying a calibration factor and/or a more sophisticated vehicle motion model, according to some examples. Next, the processor 55 may integrate the wheel encoder displacement into the overall motion estimation framework. This could be performed in several ways, such as, for example: (i) using the wheel encoder 70 as an additional measurement input to a VIO Kalman filter or factor graph, providing a direct constraint on the linear displacement Δ of the vehicle 75; (ii) using the wheel encoder 70 to detect and correct drift in the VIO estimates over long distances, by aligning the VIO trajectory with the encoder-based displacement; or (iii) using the wheel encoder 70 as a primary source of displacement information, and using VIO mainly for estimating the sensor rig's orientation and short-term motions.

The optimal approach will depend on factors such as the relative accuracy and reliability of the wheel encoder 70 and VIO estimates, the characteristics of the vehicle 75 and road surface 16, and the computational resources available. The processor 55 may also use the refined motion estimates, now incorporating the wheel encoder data, to perform the same motion compensation, 3D reconstruction, and deflection measurement steps as described above. The resulting 2D mosaics 60 and 3D reconstructions 65 should exhibit improved accuracy and consistency due to the additional constraint provided by the wheel encoder 70.

The sensor rig 25 may also comprise a vibration dampening system 130. One of the key challenges in mounting sensitive optical equipment on a heavy vehicle 75 is the significant vibration and shock forces encountered. Mitigating the vibrations of the sensor rig 25 is crucial for ensuring the quality and accuracy of the captured imagery 30, 40, 47 and sensor data. To mitigate this, the sensor rig 25 may comprises a vibration dampening system 130, which may use a combination of springs, shock absorbers, and active dampening components to isolate the sensors (e.g., cameras 20, 35, 45, IMU 50, and wheel encoder 70) from high frequency vibrations and sudden shocks due to movement of the vehicle 75 on a structurally imperfect road 15 and motion of the vehicle 75. The specific configuration of the vibration dampening system 130 may be tuned to the characteristics of the vehicle 75 and the requirements of the sensors, and may depend on factors such as the mass and geometry of the sensor rig 25, the expected frequency spectrum of the vibrations, and the desired level of isolation.

In an example configuration, the vibration dampening system 130 may be a dual-stage isolation mount. In this example setup, the sensor rig 25 is first mounted on a set of inner springs and dampers, which are then mounted on a second set of outer springs and dampers attached to the vehicle 75. This dual-stage design allows for a more gradual and controlled attenuation of vibrations, with the inner stage absorbing high-frequency vibrations and the outer stage absorbing lower-frequency vibrations and larger displacements.

The springs in the vibration dampening system 130 may be selected based on their stiffness, which determines the natural frequency of the isolation system. The goal is to choose a spring stiffness that sets the natural frequency well below the expected vibration frequencies from the vehicle 75 and road 15, so that the system 130 effectively "filters out" these high-frequency disturbances. However, the spring stiffness should also be sufficiently high enough to support the static weight of the sensor rig 25 and prevent excessive sag or deflection. The dampers in the vibration dampening system 130 help dissipate the energy of the vibrations and prevent the system 10 from resonating or oscillating excessively. The dampers may be configured as hydraulic or pneumatic devices that generate a resistive force proportional to the velocity of the vibration. The damping ratio, which is a measure of how quickly the system 10 dissipates energy, may be carefully tuned to achieve a balance between vibration attenuation and system responsiveness.

In addition to the springs and dampers, the vibration dampening system 130 may also include elastomeric mounts or bushings, according to some examples. These components may provide additional high-frequency isolation and help to decouple the sensor rig 25 from any rotational or torsional vibrations in the frame of the vehicle 75. The effectiveness of the vibration dampening system 130 can be characterized by its transmissibility curve, which plots the ratio of the output vibration amplitude to the input vibration amplitude as a function of frequency. Preferably, the system 130 will have a transmissibility curve that shows strong attenuation (low transmissibility) at frequencies above the natural frequency, and near-unity transmissibility at frequencies below the natural frequency.

To optimize the performance of the vibration dampening system 130, the processor 55 may process additional algorithms to estimate the actual vibration spectrum experienced by the sensor rig 25 during operation. This could be performed by analyzing the high-frequency components of the data of the IMU 50, or by including dedicated vibration sensors in the system 10. Based on these measurements, the processor 55 could potentially adjust the parameters of the vibration dampening system 130 (e.g., by using variable-stiffness or variable-damping elements) to adapt to different road conditions or vehicle speeds, according to an example.

FIG. 4, with reference to FIGS. 2 and 3, is a block diagram illustrating that the system 10 may further comprise a sensor interface module 80 that receives raw sensor data 85 from the first and second stereo line-scan camera pairs 20, 35, the at least one EO camera 45, the IMU 50, and a GPS receiver 90; a pre-processing module 95 that performs data processing on the raw sensor data 85 using the processor 55; a 3D reconstruction module 100 that extracts a 3D representation 105 of the road surface 16 from the processed sensor data 85x; and a deflection measurement module 110 that calculates the surface deflection δ based on the 3D representation 105.

According to an example, the sensor interface module 80 is responsible for receiving and synchronizing the raw sensor data 85 from the various sensors in the system 10, including the first and second stereo line-scan camera pairs 20, 35, the EO camera 45, the IMU 50, and a GPS receiver 90. Each of the sensors in the system 10 may generate its own raw sensor data. However, for convenience of illustration in FIG. 4, the various sensors in the system 10 are shown to collectively generate raw sensor data 85 through a sensor fusion process, according to an example. The sensor interface module 80 may include hardware components, such as data acquisition boards or frame grabbers, as well as software components, such as device drivers and communication protocols.

One of the key challenges for the sensor interface module 80 is to ensure that the raw sensor data 85 is properly timestamped and synchronized. Each sensor operates at its own frequency and with its own internal clock, so the sensor interface module 80 should establish a common temporal reference for all the data streams. This may be performed by using hardware triggers, such as the wheel encoder 70 (of FIG. 3), or by using software techniques, such as clock synchronization algorithms or post-hoc temporal alignment, according to some examples.

Once the raw sensor data 85 is synchronized, it is passed to the pre-processing module 95, which performs a series of operations on the data 85 to convert it into processed sensor data 85x and into a more suitable format for further analysis. The specific operations will depend on the type of sensor and the characteristics of the data 85, but may include, for example: For the stereo line-scan cameras 20, 35—debayering (i.e., converting raw Bayer-pattern images into full-color images), lens distortion correction, stereo rectification, and disparity computation. For the EO camera 45—debayering, lens distortion correction, image stitching (if using multiple cameras), and feature extraction (for visual odometry). For the IMU 50—bias compensation, scale factor correction, and sensor fusion (combining accelerometer, gyroscope, and possibly magnetometer data). For the GPS receiver 90—parsing NMEA sentences, applying differential corrections (if available), and converting to a common coordinate system.

The pre-processing module 95 may utilize the computational power of the processor 55 to perform these operations efficiently, possibly using parallel processing or hardware acceleration techniques. The output of the pre-processing module 95 is a set of processed sensor data that is ready for 3D reconstruction. This data is passed to the 3D reconstruction module 100, which is responsible for generating a 3D representation 105 of the road surface 16. The specific algorithms used by the module 100 may depend on the type of 3D representation desired (e.g., point cloud, mesh, or height map) and the characteristics of the processed sensor data 85x.

An example approach for 3D reconstruction from the stereo line-scan cameras 20, 35 is to use a technique called "structure from motion" (SfM). This technique involves identifying common features across multiple line-scan images, and using the motion of these features (as estimated by visual odometry) to triangulate their 3D positions. The resulting 3D point cloud can then be filtered, smoothed, and interpolated to create a continuous surface representation. The 3D reconstruction module 100 may also incorporate data from the other sensors to improve the accuracy and completeness of the 3D representation 105. For example, the data from the IMU data can be used to constrain the motion estimates and correct for drift, while the data from the GPS receiver 90 can be used to geo-reference the 3D model and align it with a global coordinate system, according to various embodiments.

Thereafter, the 3D representation 105 is passed to the deflection measurement module 110, which calculates the surface deflection δ of the road 15 by comparing the 3D geometry of the unloaded and loaded road surface 16, as captured by the first and second stereo line-scan camera pairs 20, 35, respectively. To accomplish this, the deflection measurement module 110 may first align and register the two 3D representations, so that corresponding points on the road surface 16 can be directly compared. This may be performed, according to an example, using rigid or non-rigid registration algorithms, which find the optimal transformation (translation, rotation, and possibly scaling) to align the two 3D models. Once the models are aligned, the deflection measurement module 110 can compute the vertical difference (deflection) between corresponding points on the unloaded and loaded road surface 16. These individual deflection measurements can then be aggregated and analyzed to produce summary statistics, such as the average, maximum, and standard deviation of deflection over different regions of the road. Furthermore, according to an example, the deflection measurement module 110 may also include additional features, such as outlier detection (to ignore erroneous or noisy measurements), spatial filtering (to smooth out high-frequency variations), and uncertainty estimation (to quantify the confidence of the deflection measurements based on the quality of the input data).

Figure 5:
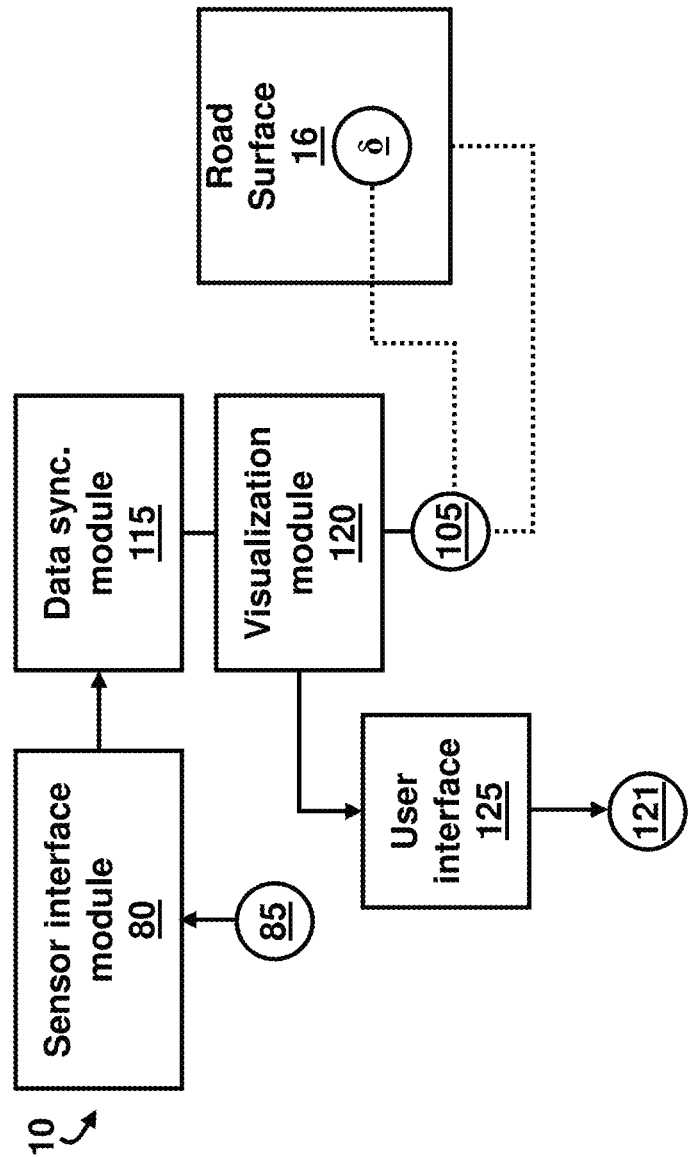
FIG. 5 is a block diagram illustrating other modules used with the system of FIGS. 2-4, according to an embodiment herein.

FIG. 5, with reference to FIGS. 2 through 4, is a block diagram illustrating that the system 10 may further comprise a data synchronization module 115 that synchronizes the raw sensor data 85 received by the sensor interface module 80; and a visualization module 120 that generates visualizations 121 of the 3D representation 105 of the road surface 16 and the calculated surface deflection δ. As such, the data synchronization module 115 is responsible for ensuring that the raw sensor data 85 received by the sensor interface module 80 is properly synchronized in time. This is helpful, as the accuracy of the 3D reconstruction 65 and deflection measurement δ depends heavily on the temporal alignment of the data from the various sensors.

The need for synchronization arises because each sensor in the system 10 operates at its own frequency and with its own internal clock. In a non-limiting example, the stereo line-scan cameras 20, 35 may capture images at a rate of 10,000 lines per second, while the IMU 50 may output data at 1,000 Hz, and the GPS receiver 90 may provide updates at only 1 Hz. Without proper synchronization, the data 85 from these sensors would be misaligned, leading to errors in the motion estimation, 3D reconstruction 65, and deflection measurement δ. Accordingly, the data synchronization module 115 uses a combination of hardware and software techniques to align the sensor data. On the hardware side, the module may utilize external trigger signals, such as those provided by the wheel encoder 70 (of FIG. 3), to ensure that all sensors capture data at precisely known intervals or positions along the trajectory of the vehicle 75, according to an example. This is known as hardware-based synchronization.

On the software side, the data synchronization module 115 may employ algorithms to estimate and correct for any residual timing offsets or clock drift between the sensors. This could involve techniques such as cross-correlation (finding the time shift that maximizes the similarity between two signals), Kalman filtering (estimating the optimal time offset based on a model of the sensor clocks), graph-based optimization (finding the globally consistent set of timestamps that minimizes the alignment error across all sensors), or dynamic time warping, according to various examples. This is known as software-based synchronization. The specific synchronization approach used by the data synchronization module 115 will depend on the characteristics of the sensors, the precision of their internal clocks, and the latency and bandwidth of their communication interfaces. In some cases, a combination of hardware and software synchronization may be necessary to achieve the desired level of temporal alignment.

Once the raw sensor data 85 is synchronized, it can be passed to the pre-processing module 95, 3D reconstruction module 100, and deflection measurement module 110, as described with reference to FIG. 4. The output of these modules 95, 100, 110, including the 3D representation 105 of the road surface 16 and the calculated surface deflection δ as well as the output of the data synchronization module 115 is then passed to the visualization module 120, which may generate visual representations or visualizations 121 of the 3D road surface model and the deflection measurements. These visualizations 121 may serve multiple purposes. For example, they may allow system operators to quickly assess the quality and completeness of the data, they may highlight areas of high deflection or unusual road surface geometry, and they may provide a way to communicate the results to users to interpret the raw data 85.

The specific types of visualizations 121 generated by the module may include, for example, (i) 2D maps or images of the road surface, with the deflection values color-coded or overlaid as contours; (ii) 3D point clouds or meshes of the road surface, with the deflection values represented by the color or height of the points/vertices; (iii) Cross-sectional views or profiles of the road surface, showing the deflection along a particular transect or slice; (iv) Statistical plots or histograms, showing the distribution of deflection values across the entire road section or within specific regions of interest; and/or (v) Time-series plots, showing how the deflection measurements change over multiple passes or over time, which could be useful for monitoring long-term trends or deterioration.

The visualization module 120 may use a variety of rendering techniques and typical software frameworks and libraries to create these visualizations. Moreover, the visualization module 120 may also include features for data exploration and analysis, such as zooming, panning, filtering, and querying of the deflection measurements. To make the visualizations easily accessible and shareable, the visualization module 120 may output them in standard formats, such as images (PNG, JPEG), videos (MP4, AVI), or web-based formats (HTML, JavaScript). The module 120 may also integrate with existing geographic information systems (GIS) or asset management systems, allowing the deflection data to be overlaid with other relevant information, such as road networks, traffic data, or maintenance records, for example.

As further shown in FIG. 5, the system 10 may further comprise a user interface 125 that outputs the visualizations 121 of the 3D representation 105 of the road surface 16 and the calculated surface deflection δ. Accordingly, in addition to generating the visualizations, the visualization module 120 may also include the user interface 125 for configuring and controlling the system 10. The user interface 125 could allow the operator to set parameters for the data acquisition, processing, and visualization modules, such as the camera frame rate, the IMU filtering options, or the color scale for the deflection maps. The interface 125 may also include options for data management, such as saving, loading, and exporting the raw sensor data 85 and the processed results.

In some examples, the user interface 125 may be a hardware graphics output device or a software application that runs on a computer or mobile device, either locally or remotely connected to the system 10. The user interface 125 is configured to provide a clear, intuitive, and responsive means for users to access, analyze, and share the deflection measurement results. The user interface 125 may include a variety of graphical elements, such as windows, menus, buttons, and toolbars, that allow users to navigate through the different visualizations 121 and control the display settings. For example, the user interface 125 may provide options for selecting specific regions of interest on the road surface 16, adjusting the color scale or transparency of the deflection overlay, or toggling between different types of visualizations (e.g., 2D maps, 3D point clouds, or cross-sectional profiles).

In addition to displaying the visualizations 121, the user interface 125 may also include features for data exploration and analysis. This could involve tools for zooming and panning around the 3D road surface model (e.g., 3D representation 105), querying the deflection values at specific locations, or comparing the results from multiple measurement runs or time periods. The user interface 125 may also allow users to apply filters or thresholds to the deflection data, highlighting areas that exceed certain criteria or fall within specific ranges. Furthermore, in an example, the user interface 125 may include options for exporting the visualizations 121 in various formats, such as images, videos, or interactive web-based dashboards. The user interface 125 may also integrate with existing data management systems or cloud-based platforms, enabling users to store, share, and access the deflection measurement results remotely.

FIG. 6, with reference to FIGS. 2 through 5, is a block diagram illustrating that the system 10 may further comprise a pair of illuminators 135 that provide focused beams of light 140 for the first and second stereo line-scan camera pairs 20, 35 to capture images 30, 40 of the road 15 thus ensuring sufficient illumination of the road surface 16 while image capturing of the road surface 16 occurs. In an example, the pair of illuminators 135 may be positioned and oriented relative to the cameras 20, 35 to optimize the lighting for accurate depth measurements of the road surface 16.

The illuminators 135 may use various types of lighting technology, such as light-emitting diodes (LEDs), lasers, or xenon flash lamps, depending on the specific requirements of the system 10, such as the required brightness, spectral characteristics, and power efficiency. The key function of the illuminators 135 is to provide uniform, high-contrast lighting of the road surface 16 as the road 15 passes beneath the stereo line-scan cameras 20, 35. This is helpful because the accuracy of the 3D reconstruction 65 and deflection measurement δ depends heavily on the ability of the cameras 20, 35 to detect and match features across the left and right images in each camera pair 20, 35. Without proper illumination, the images may suffer from low contrast, shadows, or glare, which can impede the feature matching process and lead to errors or gaps in the resulting 3D representation 105.

To achieve the desired illumination, the illuminators 135 may be mounted in close proximity to the cameras 20, 35, with their beams of light 140 selectively aligned and focused on the region of the road surface 16 that is being imaged by the cameras 20, 35. The specific mounting arrangement and beam geometry will depend on factors such as the camera field of view, the road surface texture and reflectivity, and the ambient lighting conditions, etc. An example configuration is to use a pair of illuminators 135, with one illuminator positioned above each stereo camera pair 20, 35. In an embodiment, the illuminators 135 are oriented at a shallow angle relative to the road surface 16, so that their beams of light 140 strike the road surface 16 at a grazing angle. This geometry may help to accentuate the surface texture and minimize specular reflections, which can cause saturation or blooming in the camera images.

The illuminators 135 may also incorporate various optical elements, such as lenses, diffusers, or polarizers, to shape and control the characteristics of the light beams 140. For example, a cylindrical lens may be used to create a line-shaped beam that matches the field of view of the line-scan cameras 20, 35, while a diffuser may be used to soften the shadows and reduce the contrast of the illumination. In addition to providing the primary illumination for the cameras 20, 35, the pair of illuminators 135 may also serve other functions in the system 10. For example, the illuminators 135 may be used to project structured light patterns onto the road surface 15, which can assist with the 3D reconstruction process by providing additional feature points or depth cues.

In an example, the control and synchronization of the pair of illuminators 135 with the cameras 20, 35 could be handled by the sensor interface module 80 (of FIGS. 4 and 5). The illuminators 135 may be triggered in sync with the camera exposures, using hardware signals or software commands, to ensure that the road surface 16 is consistently illuminated during the image capture process. The intensity and duration of the illumination may also be dynamically adjusted based on feedback from the cameras 20, 35 or other sensors (such as EO camera 45, IMU 50, and wheel encoder 70), to optimize the image quality under varying conditions.

Figure 7A:
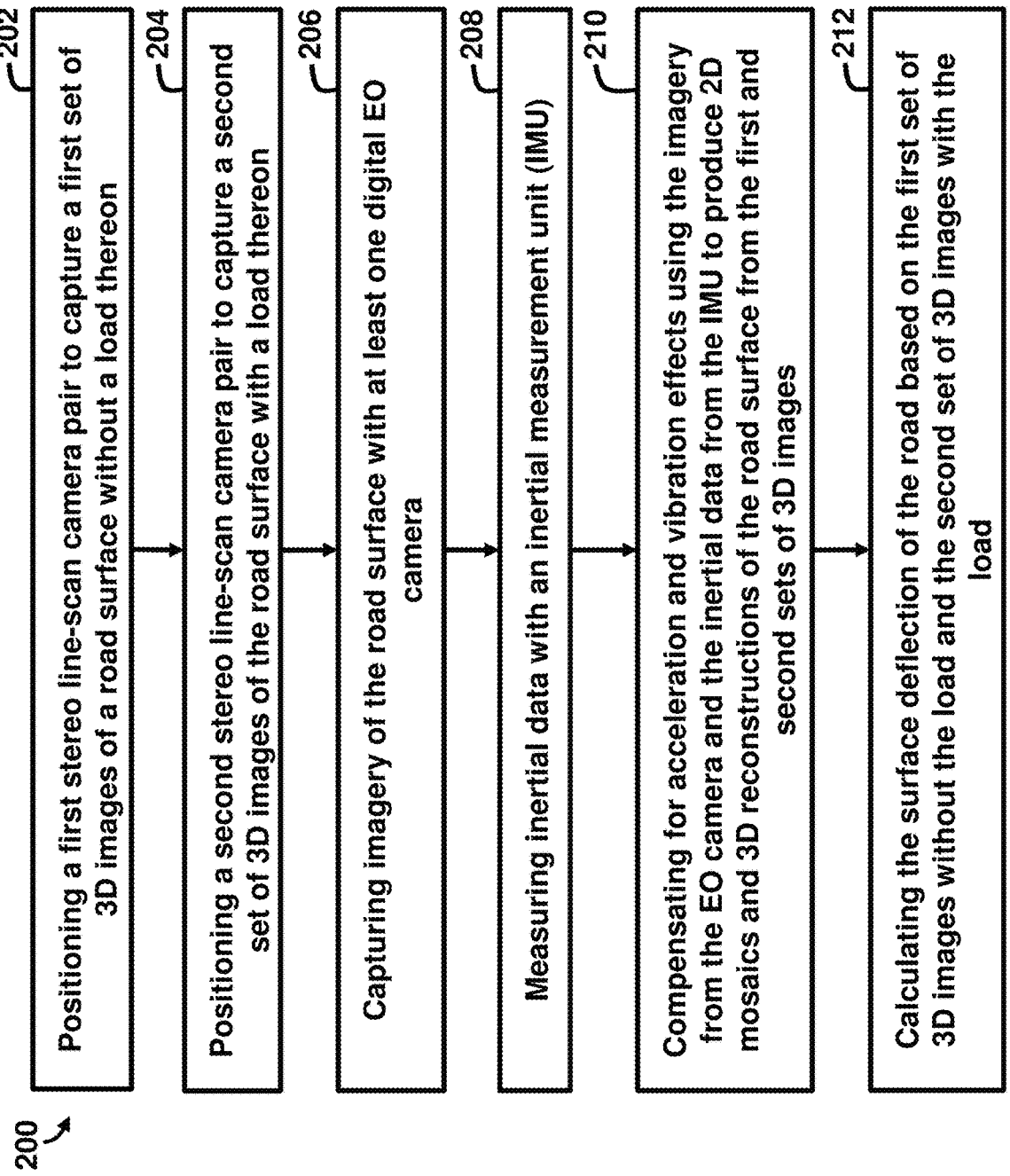

FIGS. 7A through 7M, with reference to FIGS. 2 through 6, are flow diagrams illustrating a method 200 for measuring surface deflection δ of a road 15. As shown in FIG. 7A, the method 200 comprises positioning (202) a first stereo line-scan camera pair 20 to capture a first set of 3D images 30 of a road surface 16 without a load thereon; positioning (204) a second stereo line-scan camera pair 35 at a distance d from the first stereo line-scan camera pair 20 to capture a second set of 3D images 40 of the road surface 16 with a load thereon; capturing (206) imagery 47 of the road surface 16 with at least one digital EO camera 45 rigidly attached to the sensor rig 25; measuring (208) inertial data with an inertial measurement unit (IMU) 50; compensating (210) for acceleration and vibration effects using the imagery 47 from the EO camera 45 and the inertial data from the IMU 50 to produce 2D mosaics 60 and 3D reconstructions 65 of the road surface 16 from the first and second sets of 3D images 30, 40; and calculating (212) the surface deflection δ of the road 15 based on the first set of 3D images 30 without the load and the second set of 3D images 40 with the load.

In step (202) the first stereo line-scan camera pair 20 is positioned on a sensor rig 25 to capture a first set of 3D images 30 of the road surface 16 without a load. This may occur by mounting the camera pair 20 to the sensor rig 25, which is attached to the vehicle 75 at a fixed height and orientation relative to the road surface 16. The exact positioning will depend on the desired field of view, resolution, and accuracy of the 3D reconstruction 65, and may involve a combination of manual adjustment and software-based calibrations.

In step (204) the second stereo line-scan camera pair 35 is positioned at a predetermined distance d from the first pair of cameras 20 to capture a second set of 3D images 40 of the road surface 16 with a load. In an example, the distance d may be selected based on the expected deformation behavior of the road surface 16 under load. The second camera pair 35 is mounted on the same sensor rig 25, ensuring a fixed and known spatial relationship between the two sets of images.

In step (206) imagery 47 of the road surface 16 is captured with at least one digital EO camera 45, which may be rigidly attached to the sensor rig 25. The EO camera 45 provides a wider-angle, lower-resolution view of the road surface 16, which is used later in the process to assist with motion compensation and image mosaicking. In an example, the EO camera 45 may be triggered at a lower frame rate than the line-scan cameras 20, 35, and its images may be synchronized with the line-scan data using hardware or software triggers.

In step (208) the inertial data F is measured with an IMU 50, which may also be rigidly attached to the sensor rig 25 and/or other cameras 20, 35, 45. The IMU 50 may measure the linear accelerations and angular velocities of the system 10 in three dimensions, at a high temporal resolution (e.g., hundreds or thousands of Hz). This data may be used to estimate the motion and orientation of the cameras 20, 35, 45, which is helpful for compensating for vehicle dynamics and vibrations in the image data.

In step (210) the acceleration and vibration effects are compensated for using the imagery 47 from the EO camera 45 and the inertial data F from the IMU 50. This is helpful since any uncompensated motion can lead to distortions and inaccuracies in the 3D reconstruction 65 and deflection measurement δ. The compensation may be performed in real-time, using a combination of hardware-accelerated image processing and software-based algorithms. An example technique is to use a Kalman filter or similar probabilistic framework to fuse the IMU data F with the imagery 47 from the EO camera 45, producing an estimate of the 6-degree-of-freedom (DOF) pose of the camera system over time. This pose estimate may then be used to warp and align the line-scan images, effectively removing the effects of vehicle motion. The specific algorithms and parameters used for the compensation will depend on the characteristics of the sensors, the vehicle dynamics, and the road surface conditions, and may be adapted in real-time based on the observed data.

In an example, the output of the compensation step is a set of motion-corrected line-scan images, which are then processed to produce 2D mosaics 60 and 3D reconstructions 65 of the road surface 16. The 2D mosaics 60 may be created by stitching together the individual line-scan images in the along-track direction, using the pose estimates to ensure proper alignment and overlap. The 3D reconstructions 65 may be generated by applying stereo matching algorithms to the line-scan image pairs, producing a dense point cloud or depth map of the road surface 16.

In step (212) the surface deflection δ of the road 15 is calculated based on the first set of 3D images 30 (without load) and the second set of 3D images 40 (with load). This may be performed by comparing the two 3D reconstructions 65 point-by-point, and measuring the vertical difference in height between corresponding points. The resulting deflection map provides a detailed view of how the road surface deforms under the applied load, with a spatial resolution and accuracy that is much higher than traditional point-based deflection measurement techniques.

The specific algorithms used for the deflection calculation may vary depending on the desired output format, the characteristics of the road surface, and the presence of noise or outliers in the 3D data. Example techniques include direct subtraction of the depth maps, surface fitting and differencing, or statistical analysis of the point cloud differences. The deflection values δ may be further processed to extract summary statistics, such as the mean, maximum, or percentile deflections over a certain road segment, or to identify areas of high deflection that may indicate underlying structural problems.

Overall, the method 200 described in FIG. 7A represents a highly automated and efficient approach to measuring road surface deflection, which utilizes advanced sensing, processing, and analysis techniques to provide detailed and actionable information about road condition. The method 200 is configured to be modular and adaptable, with different components and algorithms that can be optimized for specific road types, sensor rig 25 configurations, vehicle parameters, and performance requirements.

From a software perspective, the method 200 may utilize a range of pre-programmed and real-time processes, which can be controlled by software commands and instruction parameters. The pre-programmed processes may include the initial setup and calibration of the sensors, the definition of the data acquisition and processing pipelines, and the configuration of the analysis and visualization tools. These processes can be implemented using a combination of low-level firmware, device drivers, and high-level application software, which are developed and tested in advance.

The real-time processes, on the other hand, are executed continuously as the system 10 moves along the road 15, and are responsible for the actual data acquisition, processing, and analysis. These processes may be implemented using a combination of hardware-accelerated algorithms, parallel computing techniques, and efficient data structures and communication protocols, which enable the system 10 to keep up with the high data rates and low latency requirements of the application. Some examples of real-time software commands and processes used in the method 200 include (i) Triggering and synchronization of the line-scan cameras 20, 35, EO camera 45, and IMU 50 based on the vehicle speed and position; (ii) Acquisition and buffering of the raw sensor data 85, using high-speed data interfaces and memory management techniques; (iii) Pre-processing of the sensor data 85, such as image denoising, distortion correction, and data compression; (iv) Estimation of the camera system pose using Kalman filtering or other sensor fusion algorithms; (v) Image warping and alignment based on the estimated pose, using hardware-accelerated image processing functions; (vi) Stereo matching and 3D reconstruction of the line-scan images, using parallel computing algorithms on a GPU or FPGA; (vii) Calculation and analysis of the surface deflection δ, using efficient data structures and numerical libraries; and (viii) Visualization and reporting of the results, using real-time rendering and user interface frameworks. These real-time processes may be managed by a main control loop or state machine, which coordinates the different components and ensures that the system 10 operates reliably and efficiently under varying conditions.

Figure 7B:
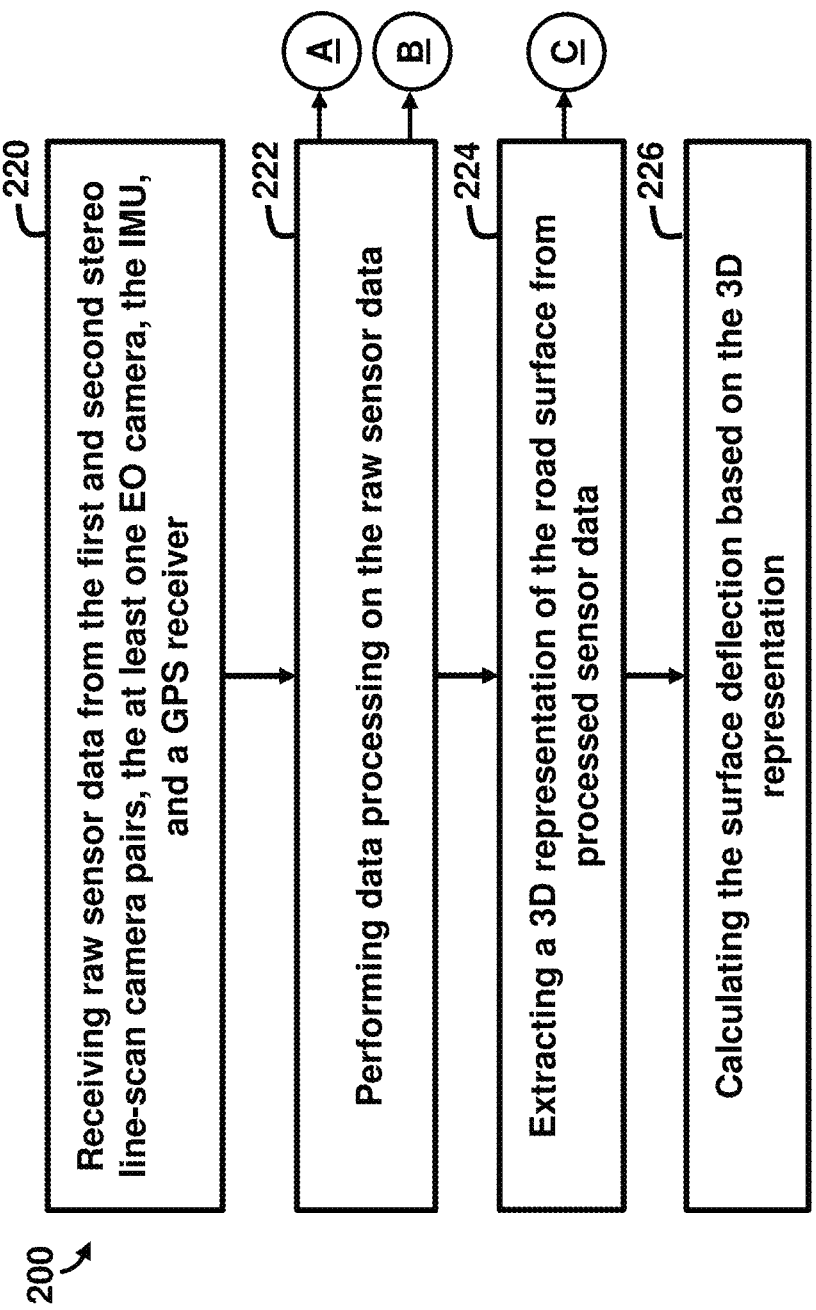

As shown in FIG. 7B, the method 200 may further comprise receiving (220) raw sensor data 85 from the first and second stereo line-scan camera pairs 20, 35, the at least one EO camera 45, the IMU 50, and a GPS receiver 90; performing (222) data processing on the raw sensor data 85; extracting (224) a 3D representation 105 of the road surface 16 from processed sensor data 85x; and calculating (226) the surface deflection δ based on the 3D representation 105. Accordingly, FIG. 7B provides further details on the data acquisition, processing, and analysis steps involved in the method 200 for measuring surface deflection δ of a road 15. These steps may involve a combination of real-time and pre-programmed processes, which are controlled by software commands and parameters.

In step (220) raw sensor data 85 is received from the various sensors in the system 10, including the first and second stereo line-scan camera pairs 20, 35, the at least one EO camera 45, the IMU 50, and the GPS receiver 90. This is a real-time process that involves continuously acquiring and buffering the sensor data 85 as the system 10 moves along the road. The raw sensor data 85 includes the high-resolution line-scan images from the stereo camera pairs 20, 35, the lower-resolution images from the EO camera 45, the inertial measurements F (accelerations and angular velocities) from the IMU 50, and the position and velocity data from the GPS receiver 90. Each of these data streams has its own unique characteristics, such as resolution, frame rate, and data format, which may need to be handled by the data acquisition software. The software commands for receiving the raw sensor data 85 may involve low-level device drivers and communication protocols, which interface with the sensors and transfer the data to the processor 55. These commands may include functions for configuring the sensors, setting the acquisition parameters (e.g., frame rate, exposure time, gain), triggering the data capture, and managing the data buffers and timestamps.

In step (222) data processing is performed on the raw sensor data 85. This may be a real-time process that involves a series of algorithms and transformations to convert the raw data into a more useful and consistent format for further analysis. The specific data processing steps will depend on the type of sensor and the requirements of the application, but may include tasks such as, for example: (i) Image denoising and enhancement-removing noise and artifacts from the line-scan images 30, 40 and EO images 47, and applying contrast and sharpness enhancements to improve the visibility of features; (ii) Distortion correction-correcting for lens distortion and other geometric aberrations in the images, using pre-calibrated camera models and parameters; (iii) Image rectification-transforming the stereo image pairs 30, 40 into a common coordinate system, to facilitate stereo matching and 3D reconstruction 65; (iv) Inertial sensor fusion-combining the accelerometer and gyroscope data from the IMU 50 to estimate the orientation and motion of the system, using techniques such as Kalman filtering or complementary filtering; and (v) GPS data processing-parsing the raw GPS data and applying corrections for factors such as atmospheric delays, clock errors, and multipath effects, to improve the accuracy and reliability of the position and velocity estimates.

The software commands for performing data processing may involve a combination of low-level image processing and signal processing functions, as well as higher-level algorithms and libraries for tasks such as camera calibration, sensor fusion, and GPS processing. These commands may be implemented using a variety of programming languages and frameworks, such as C++, Python, or MATLAB, and may leverage hardware acceleration techniques such as GPU computing or FPGA processing to achieve real-time performance, for example.

In step (224) a 3D representation 105 of the road surface 16 is extracted from the processed sensor data 85x. This may be a real-time process that involves applying stereo matching and 3D reconstruction algorithms to the rectified line-scan images, to generate a dense point cloud or depth map of the road surface. The specific algorithms used for 3D reconstruction 65 will depend on the characteristics of the road surface, the quality of the input images, and the desired output format and resolution. Example techniques include block matching, semi-global matching, and deep learning-based methods, which can achieve high accuracy and robustness in challenging scenarios such as low-texture or specular surfaces. The software commands for extracting the 3D representation 105 may involve a combination of low-level image processing functions, such as feature detection and matching, as well as higher-level algorithms and data structures for 3D reconstruction and point cloud processing. These commands may be implemented using specialized libraries and frameworks, which provide optimized and parallelized implementations of the necessary algorithms.

In step (226) the surface deflection $\delta$ is calculated based on the 3D representation 105. This may be a real-time process that involves comparing the 3D point clouds or depth maps generated from the first and second sets of line-scan images (without and with load, respectively), and measuring the vertical difference between corresponding points. The specific algorithms used for deflection calculation may vary depending on the characteristics of the road surface, the presence of noise or outliers in the 3D data, and the desired output format and resolution. Example techniques include direct subtraction of the depth maps, surface fitting and differencing, or statistical analysis of the point cloud differences. The software commands for calculating the surface deflection $\delta$ may involve a combination of low-level point cloud processing functions, such as filtering, segmentation, and registration, as well as higher-level algorithms and data structures for surface modeling and comparison. These commands may be implemented using specialized libraries and frameworks, which provide efficient and robust implementations of the necessary algorithms.

In addition to the real-time processes described above, the method 200 also involves a range of pre-programmed processes, which may be set up in advance and triggered at specific intervals or locations. These processes include tasks such as sensor calibration, data logging and storage, system monitoring and diagnostics, and user interface and visualization. The software commands for pre-programmed processes may involve higher-level scripts and configuration files, which define the parameters and settings for the various components of the system, and control the flow of data and control signals between them. These commands may be implemented using a variety of programming languages and tools, such as Python, JSON, or XML, and may use external libraries and frameworks for tasks such as data management, network communication, and user interface design.

Figure 7C:
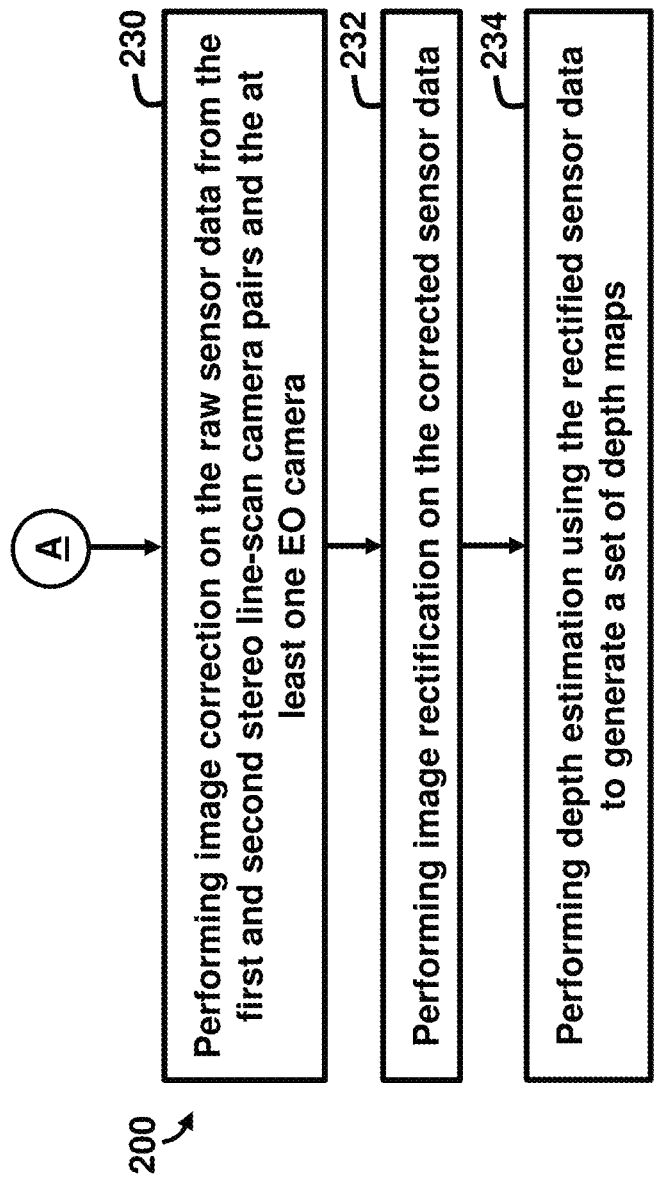

As shown in FIG. 7C, in the method 200, the performing (222) of data processing on the raw sensor data 85 may comprise performing (230) image correction on the raw sensor data 85 from the first and second stereo line-scan camera pairs 20, 35 and the at least one EO camera 45; performing (232) image rectification on the corrected sensor data (e.g., processed sensor data 85x); and performing (234) depth estimation using the rectified sensor data (e.g., processed sensor data 85x) to generate a set of depth maps.

In step (230) image correction is performed on the raw sensor data 85 from the cameras 20, 35, 45. This may be a pre-processing step that aims to remove or mitigate various types of distortions and artifacts that may be present in the raw images, such as lens distortion, vignetting, or chromatic aberration. Lens distortion refers to the non-linear deformation of the image caused by the optical characteristics of the camera lens, which can result in straight lines appearing curved or bent in the image. Vignetting refers to the reduction in brightness or saturation towards the edges of the image, caused by the physical properties of the lens and sensor. Chromatic aberration refers to the color fringing or misalignment that can occur at high-contrast edges in the image, caused by the different refractive indices of the lens material for different wavelengths of light.

To correct for these distortions, the image correction step may involve applying a set of pre-calibrated parameters to the raw images, which describe the specific characteristics of each camera and lens combination. These parameters may be obtained through a separate calibration process, which involves capturing images of a known calibration pattern (such as a checkerboard or dot grid) at different angles and distances, and using specialized software to estimate the intrinsic and extrinsic parameters of the camera model. The software commands for performing image correction may involve a combination of low-level image processing functions, such as pixel-wise transformations and interpolation, as well as higher-level algorithms and data structures for applying the calibration parameters and managing the image buffers, for example. These commands may be implemented using specialized libraries and frameworks, which provide optimized and parallelized implementations of the necessary algorithms.

In step (232) image rectification is performed on the corrected sensor data (e.g., processed sensor data 85x). This is a geometric transformation that aims to align the left and right images from each stereo camera pair 20, 35, so that corresponding points in the two images lie on the same horizontal line (i.e., have the same y-coordinate). This alignment is helpful for efficient and accurate stereo matching and depth estimation, as it reduces the search space for correspondences from a 2D region to a 1D line. Image rectification may involve applying a pair of 3×3 homography matrices to the left and right images, which describe the projective transformation between the two camera views. These matrices are obtained through a separate stereo calibration process, which involves capturing images of a known calibration pattern from both cameras simultaneously, and using specialized software to estimate the relative pose and orientation of the two cameras 20, 35. The software commands for performing image rectification may involve a combination of low-level image warping and resampling functions, as well as higher-level algorithms and data structures for applying the homography matrices and managing the image buffers. These commands may be implemented using specialized libraries and frameworks, which provide optimized and parallelized implementations of the necessary algorithms.

In step (234) depth estimation is performed using the rectified sensor data (e.g., processed sensor data 85x), to generate a set of depth maps. This may be the core processing step that extracts 3D information from the 2D stereo image pairs, by finding corresponding points in the left and right images and triangulating their 3D positions based on the known camera geometry. There are many different algorithms and approaches for performing depth estimation, ranging from simple block matching methods to more advanced global optimization techniques. An example technique is semi-global matching (SGM), which combines the efficiency of local matching with the robustness of global optimization, by aggregating matching costs along multiple 1D paths across the image. The software commands for performing depth estimation may involve a combination of low-level image processing functions, such as feature extraction and matching, as well as higher-level algorithms and data structures for cost aggregation, disparity optimization, and 3D triangulation. These commands may be implemented using specialized libraries and frameworks, which provide optimized and parallelized implementations of the necessary algorithms.

The output of the depth estimation step is a set of depth maps, which encode the distance or depth of each pixel in the rectified stereo images. These depth maps may be represented as grayscale images, where brighter pixels correspond to closer distances and darker pixels correspond to farther distances. The resolution and accuracy of the depth maps will depend on various factors, such as the resolution and baseline of the stereo cameras 20, 35, the quality and contrast of the input images, and the choice of depth estimation algorithm and parameters. The depth maps generated by this step are a key intermediate representation of the 3D structure of the road surface 16, which can be further processed and analyzed to extract more compact and semantically meaningful representations, such as 3D point clouds or surface models. These representations form the basis for the subsequent steps of the method 200, such as the calculation of the surface deflection δ and the visualization and analysis of the road condition.

Figure 7D:
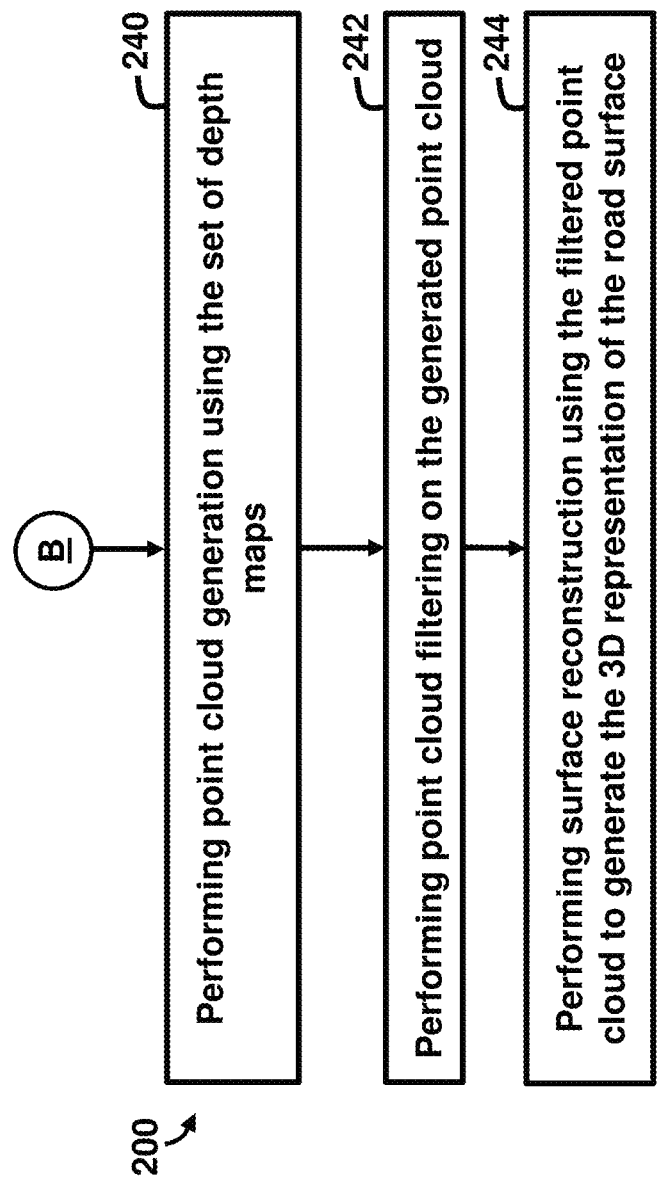

As shown in FIG. 7D, in the method 200, the extracting (224) of the 3D representation 105 of the road surface 16 may comprise performing (240) point cloud generation using the set of depth maps; performing (242) point cloud filtering on the generated point cloud; and performing (244) surface reconstruction using the filtered point cloud to generate the 3D representation 105 of the road surface 16.

In step (240) point cloud generation is performed using the set of depth maps. A point cloud is a 3D data structure that represents a collection of points in space, where each point is defined by its 3D coordinates (X, Y, Z) and optionally some additional attributes such as color or intensity. Point clouds are a common intermediate representation in 3D computer vision and robotics, as they provide a simple and flexible way to encode the geometry and appearance of a scene. To generate a point cloud from a depth map, the software may apply a set of 3D projection equations to each pixel in the depth map, based on the known intrinsic and extrinsic parameters of the camera. These equations convert the 2D pixel coordinates and corresponding depth values into 3D points in a common world coordinate system, taking into account factors such as the camera focal length, principal point, and distortion coefficients. The software commands for performing point cloud generation may involve a combination of low-level image processing and linear algebra functions, as well as higher-level algorithms and data structures for managing the point cloud data. These commands may be implemented using specialized libraries and frameworks, which provide optimized and parallelized implementations of the necessary algorithms.

In step (242) point cloud filtering is performed on the generated point cloud. This may be a pre-processing step that aims to remove or mitigate various types of noise, outliers, and artifacts that may be present in the raw point cloud data, such as measurement errors, occlusions, or moving objects. There are many different types of filters that can be applied to point clouds, depending on the specific characteristics of the data and the desired output. Some examples include: (i) Statistical outlier removal—this filter removes points that are far from their neighbors, based on a statistical analysis of the point cloud distribution; (ii) Radius outlier removal—this filter removes points that have fewer than a certain number of neighbors within a specified radius; (iii) Voxel grid down-sampling—this filter reduces the density of the point cloud by dividing it into a regular grid of 3D voxels (volumetric pixels) and replacing all the points within each voxel with their centroid; (iv) Planar segmentation—this filter segments the point cloud into planar regions and removes points that do not belong to any significant plane.

The choice and parameterization of these filters will depend on various factors, such as the density and noise level of the point cloud, the presence of outliers or occlusions, and the desired resolution and smoothness of the output. The software commands for performing point cloud filtering may involve a combination of low-level point processing and clustering functions, as well as higher-level algorithms and data structures for managing the point cloud data. These commands may be implemented using specialized libraries and frameworks, which provide optimized and parallelized implementations of the necessary algorithms.

In step (244) surface reconstruction is performed using the filtered point cloud, to generate the 3D representation 105 of the road surface 16. Surface reconstruction is the process of converting a discrete point cloud into a continuous surface model, such as a mesh or a parametric surface. There are many different algorithms and approaches for performing surface reconstruction, ranging from simple triangulation methods to more advanced implicit surface fitting techniques. An example technique is Poisson surface reconstruction, which fits a smooth indicator function to the point cloud and extracts the isosurface corresponding to a fixed value of this function. The choice of surface reconstruction algorithm will depend on various factors, such as the density and noise level of the point cloud, the presence of holes or discontinuities, and the desired topology and resolution of the output surface. The software commands for performing surface reconstruction may involve a combination of low-level point processing and triangulation functions, as well as higher-level algorithms and data structures for surface fitting and mesh generation. These commands may be implemented using specialized libraries and frameworks, which provide optimized and parallelized implementations of the necessary algorithms.

The output of the surface reconstruction step may be a 3D mesh or surface model that represents the geometry of the road surface 16 in a compact and continuous form. This model can be further processed and analyzed to extract higher-level features and properties, such as surface normals, curvature, or texture, which can be used for tasks such as road condition assessment, pothole detection, or crack mapping. The 3D representation 105 generated by this step may be input to the subsequent steps of the method 200, such as the calculation of the surface deflection δ and the visualization and analysis of the road condition. The accuracy, resolution, and completeness of this representation will have a direct impact on the performance and reliability of these downstream tasks.

Figure 7E:
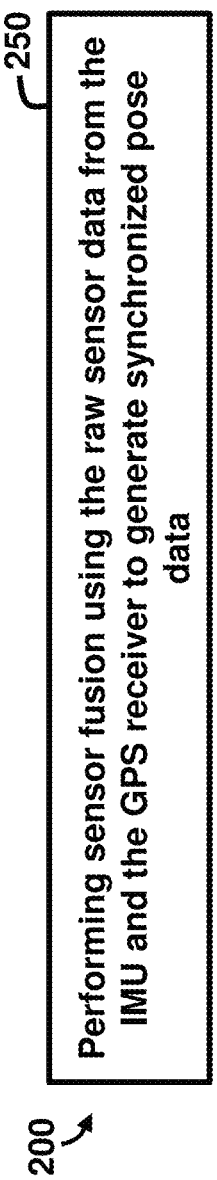

As shown in FIG. 7E, the method 200 may further comprise performing (250) sensor fusion using the raw sensor data 85 from the IMU 50 and the GPS receiver 90 (e.g., the sensors) to generate synchronized pose data. Here, the sensor fusion process combines data from the multiple sensors to obtain a more accurate, complete, and robust estimate of the state of the system 10, with the goal of estimating the 6 degrees-of-freedom (DOF) pose (position and orientation) of the sensor rig 25 as it moves along the road surface 16.

The IMU 50 provides high-frequency measurements of the linear acceleration and angular velocity of the sensor rig 25. These measurements can be integrated over time to estimate the position, velocity, and orientation of the sensor rig 25 relative to its starting point. However, IMU data is subject to various sources of error, such as bias, drift, and noise, which can accumulate over time and lead to significant errors in the pose estimate. To mitigate these errors, the IMU data may be fused with measurements from the GPS receiver 90, which provides absolute position and velocity information in a global coordinate system. GPS data is less frequent and more noisy than IMU data, but it generally does not suffer from the same long-term drift and bias issues. By combining the high-frequency IMU data with the low-frequency GPS data, the sensor fusion algorithm can obtain a more accurate and stable estimate of the pose of the sensor rig 25.

An example technique for performing sensor fusion in accordance with the embodiments herein is the extended Kalman filter (EKF), which is a recursive Bayesian estimation algorithm that combines a motion model of the system 10 with a measurement model of the sensors. The motion model may predict the state of the system 10 at the next time step based on its current state and the IMU measurements, while the measurement model updates the state estimate based on the GPS measurements and their associated uncertainties. The EKF may operate in two main stages: prediction and update. In the prediction stage, the filter uses the motion model to propagate the state estimate and its covariance matrix forward in time, based on the IMU measurements. In the update stage, the filter uses the measurement model to compute the difference between the predicted state and the GPS measurements, and updates the state estimate and covariance matrix accordingly. This process may be repeated recursively for each new set of IMU and GPS measurements, producing a continuous estimate of the pose of the sensor rig 25 over time. The software commands for performing sensor fusion using the EKF may involve a combination of low-level numerical integration and linear algebra functions, as well as higher-level algorithms and data structures for state estimation and covariance propagation. These commands may be implemented using specialized libraries and frameworks, which provide optimized and parallelized implementations of the necessary algorithms.

The output of the sensor fusion step is a set of synchronized pose data, which describes the position and orientation of the sensor rig 25 at each time step, along with an estimate of the uncertainty in these values. This pose data is input to the subsequent steps of the method 200, such as the point cloud registration and surface deflection calculation, as it enables the accurate alignment and comparison of the 3D data captured by the stereo line-scan cameras 20, 35 and the EO camera 45. The performance and accuracy of the sensor fusion algorithm will depend on various factors, such as the quality and frequency of the IMU and GPS measurements, the accuracy of the motion and measurement models, and the tuning of the EKF parameters. Furthermore, the sensor fusion step may also incorporate additional techniques, such as outlier rejection, bias estimation, or multi-sensor calibration, to further improve the robustness and reliability of the pose estimation.

As shown in FIG. 7F, the method 200 may further comprise performing (252) point cloud registration using the synchronized pose data to align the generated point cloud. The point cloud registration process aligns two or more point clouds that represent the same object or scene, but are captured from different viewpoints or at different times, and more specifically to align the point clouds generated by the stereo line-scan cameras 20, 35 as the sensor rig 25 moves along the road surface 16. The use of the point cloud registration process arises because the sensor rig 25 is in constant motion during the data acquisition process, which means that each point cloud is captured from a different position and orientation. To create a consistent and seamless 3D model of the road surface 16, these point clouds need to be transformed and aligned into a common coordinate system.

The synchronized pose data generated by the sensor fusion step (250) in FIG. 7E plays a key role in this registration process. The pose data provides an estimate of the position and orientation of the sensor rig 25 at each time step, which can be used to transform the corresponding point clouds into a common coordinate frame. This transformation may be performed using a rigid body transformation, which may involve the use of a rotation matrix and a translation vector. An example technique for performing point cloud registration using pose data is the iterative closest point (ICP) algorithm, which operates in two main steps: correspondence estimation and transformation estimation. In the correspondence estimation step, the algorithm finds the closest point in the target point cloud for each point in the source point cloud. In the transformation estimation step, the algorithm computes the rigid body transformation that minimizes the distance between the corresponding points.

The ICP algorithm iterates between these two steps until a certain convergence criterion is met, such as a maximum number of iterations or a minimum change in the transformation parameters. The output of the ICP algorithm is a set of transformation parameters that align the source point cloud with the target point cloud. In the context of the road deflection measurement system 10, the ICP algorithm can be applied sequentially to align each new point cloud with the previously registered point clouds, using the synchronized pose data as an initial estimate of the transformation. This process creates a continuous and consistent 3D model of the road surface 16 as the sensor rig 25 moves along the road 15.

The software commands for performing point cloud registration using the ICP algorithm may involve a combination of low-level point processing and nearest neighbor search functions, as well as higher-level algorithms and data structures for transformation estimation and optimization. These commands may be implemented using specialized libraries and frameworks, which provide optimized and parallelized implementations of the necessary algorithms. The performance and accuracy of the point cloud registration step will depend on various factors, such as the quality and density of the point clouds, the accuracy of the synchronized pose data, and the tuning of the ICP parameters. Moreover, the registration step may also incorporate additional techniques, such as outlier rejection, multi-resolution matching, or feature-based alignment, to improve the robustness and efficiency of the registration process. The output of the point cloud registration step is a set of aligned point clouds that represent the 3D geometry of the road surface 16 in a common coordinate system. This aligned point cloud is input to the subsequent steps of the method 200, such as the surface reconstruction and deflection calculation, as it provides a consistent and accurate representation of the road surface geometry.

As shown in FIG. 7G, the method 200 may further comprise storing (254) the raw sensor data 85 and the processed sensor data 85x using a data recorder. In another example, the raw sensor data 85 and the processed sensor data 85x may be stored using cloud storage. Data storage enables the long-term preservation, retrieval, and sharing of the data generated by the system 10, and the data recorder is responsible for storing two main types of data: the raw sensor data 85 and the processed sensor data 85x. The raw sensor data 85 includes the unprocessed measurements and imagery 30, 40, 47 captured by the various sensors in the system 10, such as the stereo line-scan cameras 20, 35, the EO camera 45, the IMU 50, and the GPS receiver 90. This data 85 represents the original, unmodified output of the sensors and may be stored in a raw format, such as binary files or proprietary sensor formats. The processed sensor data 85x, on the other hand, includes the intermediate and final results of the various data processing steps in the method 200, such as the depth maps, point clouds, aligned point clouds, surface models, and deflection measurements. This data 85x represents the output of the algorithms and software modules that operate on the raw sensor data 85 to extract meaningful information and insights about the road surface 16.

The data recorder may be configured as a dedicated hardware and software component of the road deflection measurement system 10, which is responsible for managing the storage, organization, and retrieval of the data generated by the system 10. The data recorder may comprise of one or more storage devices, such as hard disk drives, solid-state drives, or removable storage media, as well as a software layer that provides an interface for reading and writing data to these devices, and may be located locally on or attached to the sensor rig 25 or remotely connected to the sensor rig 25. The software commands for storing data 85, 85x using the data recorder may involve a combination of low-level file input/output (I/O) operations, as well as higher-level data management and organization functions. These commands may be implemented using standard libraries and frameworks, which provide high-level abstractions for reading and writing data 85, 85x to files and other storage devices.

In addition to the basic data storage functions, the data recorder may also implement various data management and organization techniques to facilitate the efficient retrieval, analysis, and sharing of the stored data 85, 85x. These techniques may include, for example: (i) Data compression—the data recorder may use lossless or lossy compression algorithms to reduce the size of the stored data 85, 85x and minimize the storage requirements of the system; (ii) Data indexing—the data recorder may create an index or a database of the stored data 85, 85x, which allows for fast and efficient retrieval of specific data 85, 85x items based on various criteria, such as timestamp, location, or sensor type; (iii) Data partitioning—the data recorder may partition the stored data 85, 85x into smaller, more manageable chunks based on various criteria, such as time intervals or spatial regions, to facilitate parallel processing and analysis of the data 85, 85x; and (iv) Data backup and replication—the data recorder may create periodic backups or replicas of the stored data 85, 85x to ensure data integrity and protect against data loss due to hardware failures or other issues.

As shown in FIG. 7H, the method 200 may further comprise managing (256) system settings and parameters for the sensor interface module 80, the pre-processing module 95, and the 3D reconstruction module 100 using a configuration manager. This step of system configuration and parameter management enables the consistent and reproducible operation of the system 10 across different environments, users, and data sets. In the context of the road deflection measurement system 10, the configuration manager may be responsible for managing the settings and parameters of three main modules: the sensor interface module 80, the pre-processing module 95, and the 3D reconstruction module 100.

The sensor interface module 80 is responsible for managing the communication and data acquisition from the various sensors in the system 10, such as the stereo line-scan cameras 20, 35, the EO camera 45, the IMU 50, and the GPS receiver 90. The configuration manager interacts with the sensor interface module 80 to set and adjust various parameters, such as the sensor frame rates, exposure times, gain settings, and triggering modes, based on the specific requirements and conditions of each data collection scenario. The pre-processing module 95 is responsible for applying various data processing and enhancement algorithms to the raw sensor data 85, such as image debayering, lens distortion correction, and noise reduction. The configuration manager may interact with the pre-processing module 95 to set and adjust various parameters, such as the algorithm selection, filter sizes, and threshold values, based on the quality and characteristics of the raw sensor data 85 and the desired output of the pre-processing step. The 3D reconstruction module 100 may be responsible for generating 3D point clouds, surfaces, and models from the pre-processed (raw) sensor data 85, using various computer vision and photogrammetry techniques, such as stereo matching, point cloud registration, and surface reconstruction, for example. The configuration manager may interact with the 3D reconstruction module 100 to set and adjust various parameters, such as the stereo matching algorithm, disparity range, point cloud density, and surface resolution, based on the quality and characteristics of the pre-processed (raw) sensor data 85 and the desired level of detail and accuracy of the 3D reconstruction.

The configuration manager may be configured as a software component that is accessible through the user interface 125 and a set of APIs for reading, writing, and updating the system settings and parameters. The user interface 125 may be a graphical user interface (GUI) that allows users to view, edit, and save the configuration settings using a visual and intuitive interface, or a command-line interface (CLI) that allows users to interact with the configuration manager using text-based commands and scripts. Furthermore, the configuration manager may store the system settings and parameters in various formats, such as configuration files, databases, or key-value stores, depending on the specific requirements and constraints of the system 10. The configuration files may be in various formats, such as JSON, YAML, or XML, which provide a human-readable and machine-parsable representation of the configuration data.

The software commands for managing system settings and parameters using the configuration manager may involve a combination of low-level file I/O and data serialization operations, as well as higher-level data validation, version control, and user authentication functions. These commands may be implemented using standard libraries and frameworks, which provide high-level abstractions for reading, writing, and manipulating configuration data. In addition to the basic configuration management functions, the configuration manager may also implement various advanced features and capabilities, such as: (i) Configuration templates—the configuration manager may provide a set of pre-defined configuration templates for common data collection scenarios, which can be used as a starting point for creating new configurations or as a reference for comparing and validating existing configurations; (ii) Configuration versioning—the configuration manager may keep track of the version history of the configuration settings and parameters, allowing users to view, compare, and revert changes to the configuration over time; (iii) Configuration validation—the configuration manager may perform various validation checks on the configuration settings and parameters, such as range checks, type checks, and consistency checks, to ensure that the configuration is valid and consistent with the system requirements and constraints; and (iv) Configuration security—the configuration manager may implement various security measures, such as user authentication, access control, and data encryption, to protect the configuration data from unauthorized access or modification.

As shown in FIG. 7I, the method 200 may further comprise performing (258) EO mosaicking to create a mosaic image from the raw sensor data 85 captured by the at least one EO camera 45. Here, EO mosaicking is used to create a large, seamless image from a collection of smaller, overlapping images taken by the EO camera 45 of the road surface 16 as the vehicle 75 moves along the road 15. These images may have a smaller field of view and lower resolution compared to the line-scan images 30, 40 captured by the stereo line-scan cameras 20, 35, but they provide a wider context and a more complete coverage of the road surface 16. The EO mosaicking step may stitch together these overlapping images into a single, large mosaic image that covers the entire survey area. This mosaic image can be used for various purposes, such as visual inspection, feature extraction, and geospatial referencing of the road surface data. The EO mosaicking process may involve several sub-steps, including, for example: (i) Image pre-processing—the raw EO images 47 may be first pre-processed to remove any radiometric and geometric distortions, such as lens distortion, vignetting, and sensor noise, which helps ensure that the images have a consistent quality and geometry before the mosaicking process; (ii) Image matching—the overlapping areas between adjacent EO images 47 may be identified using various feature matching techniques, such as SIFT, SURF, or ORB, which can detect and match distinctive features, such as corners, edges, and textures, between the images, and estimate the relative pose and orientation of the images; (iii) Image warping—the matched images may then be warped and aligned to a common reference frame using various image transformation techniques, such as affine, projective, piece-wise linear, or polynomial transformations, which helps ensures that the overlapping areas of the images are properly aligned and registered; (iv) Image blending—the aligned images may then be blended together to create a seamless mosaic image using various image blending techniques, such as feathering, multi-band blending, or pyramid blending, which helps ensure that the transitions between the images are smooth and continuous, and that the radiometric and color differences between the images are minimized; and (v) Mosaic optimization—the resulting mosaic image may then be optimized to remove any remaining artifacts, such as seams, gaps, or duplications, using various optimization techniques, such as graph cuts, Poisson blending, or optical flow, which helps ensure that the final mosaic image has a high quality and a consistent appearance.

The software commands for performing EO mosaicking may involve a combination of low-level image processing operations, such as feature detection, image warping, and image blending, as well as higher-level optimization and quality control functions. These commands may be implemented using standard libraries and frameworks, which provide high-level abstractions and efficient implementations for various image processing and computer vision tasks. In addition to the basic mosaicking functions, the EO mosaicking module may also implement various advanced features and capabilities, such as, for example: (i) Multi-scale mosaicking—the mosaicking process may be performed at multiple scales or resolutions, allowing for the creation of multi-scale mosaic images that can be used for different purposes, such as overview maps, detailed inspections, or multi-resolution analysis; (ii) Geospatial referencing—the mosaic image may be georeferenced to a standard coordinate system, such as UTM or WGS84, using the GPS data from the vehicle 75 and the camera calibration parameters, which may allow for the integration of the mosaic image with other geospatial data, such as road networks, land use maps, or terrain models; and (iii) Mosaic updating—the mosaicking process may be performed incrementally, allowing for the continuous updating and expansion of the mosaic image as new EO images 47 are collected during the survey, which may allow for the creation of large, up-to-date mosaic images that cover extensive road networks or survey areas.

As shown in FIG. 7J, the method 200 may further comprise performing (260) line-scan/EO data alignment to align the raw sensor data 85 from the first and second stereo line-scan camera pairs 20, 35 with the raw sensor data 85 from the at least one EO camera 45. The line-scan/EO data alignment enables the fusion and integration of the different types of image data 30, 40, 47 collected by the system 10. The line-scan cameras 20, 35 and the EO camera 45 may have different characteristics in terms of resolution, field of view, and acquisition frequency, and they may capture different aspects of the road surface 16. For example, the line-scan cameras 20, 35 may provide high-resolution, detailed images 30, 40 of the road surface 16, but they may have a narrow field of view and require precise synchronization with the motion of the vehicle 75. Conversely, the EO camera 45 may provide lower-resolution, contextual images 47 of the road surface 16, but it may have a wider field of view and may be less sensitive to the motion of the vehicle 75.

The line-scan/EO data alignment step may help establish a precise mapping between the pixels in the line-scan images 30, 40 and the corresponding pixels in the EO images 47, so that the information from both types of images 30, 40 and 47 can be combined and analyzed in a consistent and accurate manner. This mapping may allow for the transfer of features, annotations, and measurements between the different image spaces, and it helps enable the use of the EO images 47 as a reference for the line-scan images 30, 40. The line-scan/EO data alignment process may involve several sub-steps, including, for example: (i) Temporal synchronization—the timestamps of the line-scan images 30, 40 and the EO images 47 may be first synchronized using the GPS and IMU data from the vehicle 75, to ensure that the images 30, 40, 47 are properly aligned in time, and to help account for the different acquisition frequencies and exposure times of the cameras 20, 35, 45, as well as any delays or latencies in the data acquisition and transmission; (ii) Spatial calibration—the intrinsic and extrinsic parameters of the line-scan cameras 20, 35 and the EO camera 45 may be estimated using various calibration techniques, such as checkerboard calibration or self-calibration, and describe the internal geometry and the relative pose of the cameras 20, 35, 45, and they are used to correct for any distortions or misalignments in the images 30, 40, 47; (iii) Image co-registration—the line-scan images 30, 40 and the EO images 47 may then be co-registered to a common reference frame using various image registration techniques, such as feature-based registration or intensity-based registration, which may estimate the optimal transformation (e.g., affine, projective, or polynomial) that aligns the images 30, 40, 47 based on their feature correspondences or intensity patterns; (iv) Pixel-level mapping—the co-registered images 30, 40, 47 may then be used to establish a pixel-level mapping between the line-scan images 30, 40 and the EO images 47, using various interpolation and resampling techniques, such as nearest-neighbor, bilinear, or bicubic interpolation, which allows for the transfer of pixel values and coordinates between the different image spaces; and (v) Quality assessment—the accuracy and consistency of the line-scan/EO data alignment may be assessed using various quality metrics, such as the root-mean-square error (RMSE) or the normalized cross-correlation (NCC), to ensure that the alignment meets the required performance and reliability criteria.

The software commands for performing line-scan/EO data alignment may involve a combination of low-level image processing operations, such as image warping, resampling, and interpolation, as well as higher-level optimization and quality control functions. These commands may be implemented using standard libraries and frameworks, which provide high-level abstractions and efficient implementations for various image processing and computer vision tasks. In addition to the basic alignment functions, the line-scan/EO data alignment module may also implement various advanced features and capabilities, such as, for example: (i) Multi-scale alignment—the alignment process may be performed at multiple scales or resolutions, allowing for the progressive refinement and optimization of the alignment parameters and the pixel-level mapping; (ii) Uncertainty estimation—the alignment module may estimate the uncertainty or confidence of the pixel-level mapping, based on factors such as the image quality, the feature density, or the transformation model, which can be used to weight or filter the data in subsequent processing steps; and (iii) Temporal updating—the alignment process may be performed incrementally, allowing for the continuous updating and refinement of the pixel-level mapping as new line-scan images 30, 40 and EO images 47 are collected during the survey, which allows for the adaptation of the alignment to changes in the road surface 16 or the motion of the vehicle 75.

As shown in FIG. 7K, in the method 200, the extracting (224) of the 3D representation 105 of the road surface 16 may comprise generating (262) a look-ahead 3D point cloud using the raw sensor data 85 from the first stereo line-scan camera pair 20 and an under-load 3D point cloud using the raw sensor data 85 from the second stereo line-scan camera pair 35. The 3D point cloud is a digital representation of a surface or object, and includes a large number of individual 3D points, each defined by its X, Y, and Z coordinates in a common reference frame. The 3D point clouds are used to represent the shape and deformation of the road surface 16 under different loading conditions. The look-ahead 3D point cloud is generated using the raw sensor data 85 from the first stereo line-scan camera pair 20, which may capture the road surface 16 ahead of the vehicle's wheels. This point cloud represents the unloaded or undisturbed state of the road surface 16, and it serves as a reference for measuring the deflection δ caused by the vehicle's load. The under-load 3D point cloud, on the other hand, is generated using the raw sensor data 85 from the second stereo line-scan camera pair 35, which may capture the road surface 16 directly under the vehicle's wheels. This point cloud represents the loaded or deformed state of the road surface 16, and it captures the deflection & caused by the weight of the vehicle 75 and the structural response of the road 15.

The process of generating the 3D point clouds from the stereo line-scan images 30, 40 may involve several sub-steps, including, for example: (i) Stereo rectification—the left and right images from each stereo line-scan camera pair 20, 35 may be rectified to align their epipolar lines, which simplifies the correspondence matching problem, and which may be performed using the intrinsic and extrinsic calibration parameters of the cameras 20, 35, which are estimated through a separate calibration process; (ii) Disparity estimation—the rectified stereo images 30, 40 may then be used to estimate the disparity map, which represents the pixel-wise correspondence between the left and right images such that the disparity map may encode the horizontal shift or parallax between the corresponding pixels in the two images 30, 40, which may be inversely proportional to the depth of the pixels, and in some examples, various stereo matching algorithms, such as block matching, semi-global matching, or deep learning-based methods, can be used to estimate the disparity map; (iii) Depth estimation—the disparity map may then be converted to a depth map, which may represent the distance of each pixel from the camera plane, such that this conversion may be performed using the camera calibration parameters and the stereo geometry, which relate the disparity values to the actual depth values; (iv) Point cloud generation—the depth map may then be used to generate the 3D point cloud, by projecting each pixel into the 3D space using the camera calibration parameters and the depth values, whereby this projection transforms the 2D image coordinates and the corresponding depth values into 3D points in a common reference frame, which may be the camera coordinate system, and the resulting point cloud provides a full 3D representation of the road surface, where each point has X, Y, and Z coordinates; and (v) Point cloud filtering and downsampling—the raw point cloud generated from the depth map may contain noise, outliers, and redundant points, which can affect the accuracy and efficiency of the subsequent processing steps, and therefore, various filtering and downsampling techniques, such as statistical outlier removal, voxel grid downsampling, or surface normal filtering, may be applied to the point cloud to remove the unwanted points and to reduce the point density while preserving the essential geometric features.

The software commands for generating the look-ahead and under-load 3D point clouds may involve a combination of low-level image processing operations, such as stereo rectification, disparity estimation, and depth projection, as well as higher-level point cloud processing and filtering functions. These commands may be implemented using standard libraries and frameworks, which provide high-level abstractions and efficient implementations for various image processing, computer vision, and point cloud processing tasks.

In addition to the basic point cloud generation functions, the 3D reconstruction module may also implement various advanced features and capabilities, such as, for example: (i) Real-time processing—the point cloud generation process may be performed in real-time, allowing for the continuous and on-the-fly reconstruction of the road surface 16 as the vehicle 75 moves along the road 15, and may require efficient and optimized implementations of the stereo matching, depth estimation, and point cloud generation algorithms, as well as the use of parallel computing and GPU acceleration techniques; (ii) Multi-resolution processing—the point cloud generation process may be performed at multiple resolutions or levels of detail, allowing for the creation of multi-scale representations of the road surface 16 that can be used for different purposes, such as overview visualization, detailed analysis, or data compression; and (iii) Georeferencing—the look-ahead and under-load point clouds may be georeferenced to a common spatial reference system, such as a global or local coordinate system, using the GPS and IMU data from the vehicle 75, which may allow for the integration and alignment of the point clouds with other spatial data, such as road networks, terrain models, or aerial imagery.

Figure 7L:
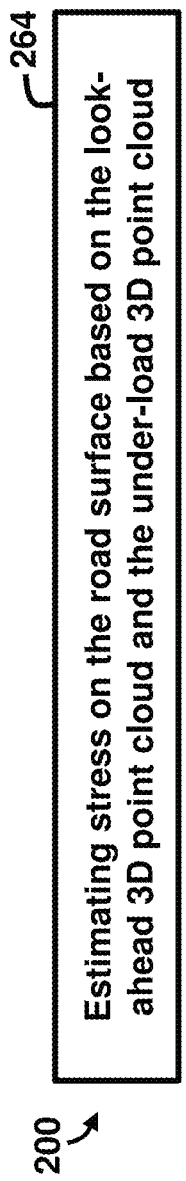

As shown in FIG. 7L, the method 200 may further comprise estimating (264) stress on the road surface 16 based on the look-ahead 3D point cloud and the under-load 3D point cloud. This step is a part of the data interpretation and analysis module of the system 10 and is focused on deriving quantitative measures of the mechanical stress experienced by the road surface under the load of the vehicle 75. In the context of road engineering and pavement management, stress refers to the internal forces that are developed within the road structure when it is subjected to external loads, such as the weight of vehicles, the pressure of tires, or the impact of environmental factors. Stress may be an indicator of the structural performance of the road 15 and can be used to assess the condition of the road 15 to predict its future deterioration, and to plan and prioritize maintenance and rehabilitation activities.

The process of estimating the stress on the road surface 16 based on the look-ahead and under-load 3D point clouds may involve several sub-steps, including, for example: (i) Point cloud registration—the look-ahead and under-load point clouds may be first registered or aligned to a common coordinate system, using the GPS and IMU data from the vehicle 75, as well as the known spatial and temporal relationships between the two stereo line-scan camera pairs 20, 35, such that this registration may ensure that the two point clouds represent the same section of the road surface 16 and that they can be directly compared and analyzed; (ii) Surface normal estimation—the registered point clouds may then be used to estimate the surface normals at each point, which may represent the orientation and direction of the local surface patches, such that the surface normals may be computed using various techniques, such as principal component analysis (PCA), least-squares plane fitting, or deep learning-based methods, and they may provide important information about the geometry and curvature of the road surface 16; (iii) Deflection estimation—the registered point clouds and the surface normals may then be used to estimate the vertical deflection of the road surface 16 under the load of the vehicle 75, and this is may be performed by comparing the elevation or height differences between corresponding points in the look-ahead and under-load point clouds, taking into account the surface normals and the known vertical offset between the two camera pairs 20, 35 such that the resulting deflection map may represent the spatial distribution and magnitude of the road surface deformation $\delta$ caused by the vehicle load; (iv) Stress estimation—the deflection map may then be used to estimate the mechanical stress on the road surface 16, using various stress-strain models and material properties of the pavement layers, and these models may relate to the observed deflections to the internal stresses and strains in the pavement structure, based on the known thickness, stiffness, and Poisson's ratio of the different layers (e.g., surface, base, and subgrade), and accordingly the resulting stress map may represent the spatial distribution and magnitude of the normal and shear stresses experienced by the road surface 16 under the vehicle load; and (v) Stress analysis—the estimated stress map may then be analyzed and interpreted to derive various stress-related parameters and indicators, such as the maximum principal stress, the von Mises stress, or the shear stress ratio, such that these parameters may provide quantitative measures of the structural performance of the road 15 and can be used to identify areas of high stress concentration, to assess the load-carrying capacity of the road 15, and to evaluate the effectiveness of different maintenance and rehabilitation strategies.

The software commands for estimating the stress on the road surface 16 based on the look-ahead and under-load 3D point clouds may involve a combination of low-level point cloud processing operations, such as registration, normal estimation, and surface fitting, as well as higher-level stress analysis and visualization functions. These commands may be implemented using standard libraries and frameworks, which provide high-level abstractions and efficient implementations for various point cloud, geometry, and finite element analysis tasks.

In addition to the basic stress estimation functions, the data interpretation and analysis module may also implement various advanced features and capabilities, such as, for example: (i) Uncertainty quantification—the stress estimation process may incorporate various sources of uncertainty, such as the measurement errors of the sensors, the variability of the pavement materials, or the simplifications of the stress-strain models, such that the module may use various techniques, such as Monte Carlo simulation, Bayesian inference, or sensitivity analysis, to quantify and propagate these uncertainties through the stress estimation pipeline and to provide confidence intervals or probability distributions for the estimated stress values; (ii) Multi-scale analysis—the stress estimation process may be performed at multiple scales or resolutions, allowing for the characterization of the structural performance of the road 15 at different levels of detail, from the individual pavement layers to the entire road network, and this multi-scale analysis can help to identify the critical factors and mechanisms that control the structural behavior of the road 15 and to optimize the maintenance and rehabilitation strategies accordingly; and (iii) Data fusion—the stress estimation process may integrate additional data sources, such as traffic volumes, environmental conditions, or historical maintenance records, to improve the accuracy and reliability of the stress predictions and to enable more comprehensive and data-driven decision-making, whereby this data fusion can be achieved using various techniques, such as machine learning, statistical modeling, or multi-criteria optimization, depending on the specific data types and analysis goals.

Figure 7M:
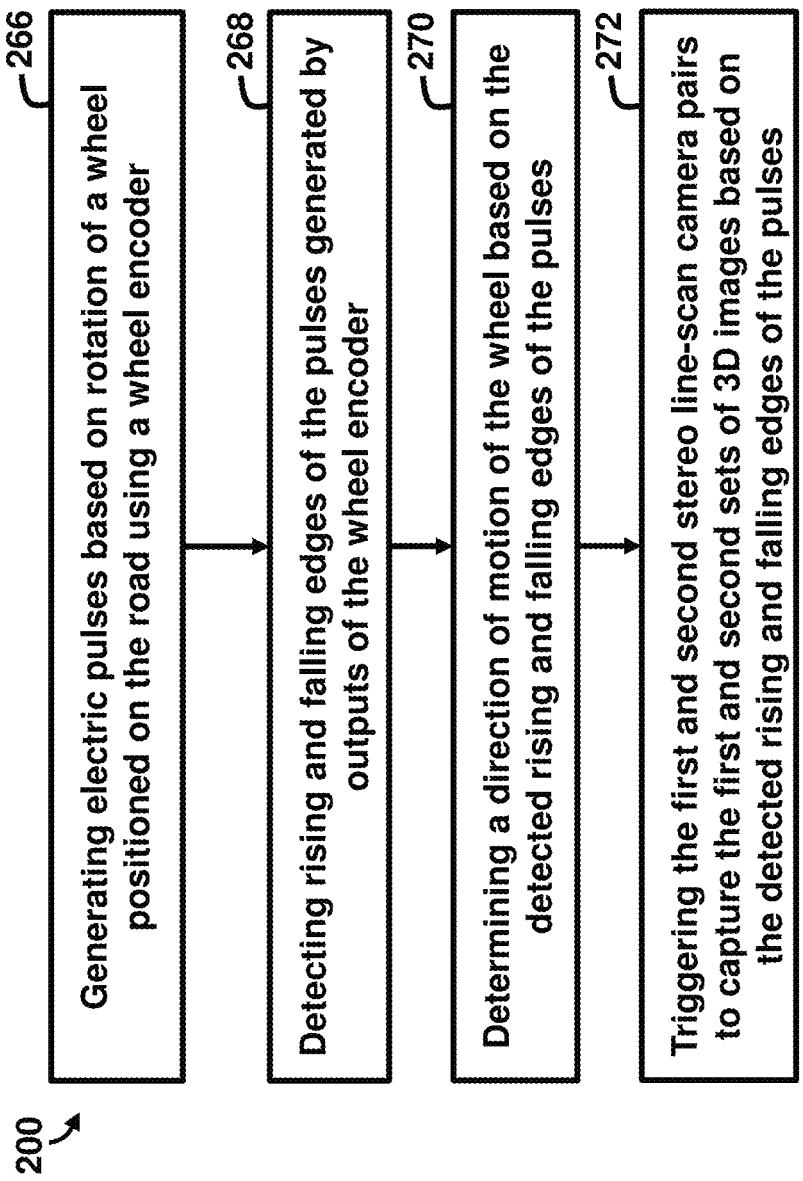

As shown in FIG. 7M, the method 200 may further comprise generating (266) electric pulses based on rotation of a wheel positioned on the road 15 using a wheel encoder 70; detecting (268) rising and falling edges of the pulses generated by outputs of the wheel encoder 70; determining (270) a direction of motion of the wheel based on the detected rising and falling edges of the pulses; and triggering (272) the first and second stereo line-scan camera pairs 20, 35 to capture the first and second sets of 3D images 30, 40 based on the detected rising and falling edges of the pulses. In an example, the wheel encoder 70 may be an electromechanical device that converts the angular position or motion of a shaft or axle into a series of electrical pulses. Moreover, the wheel encoder 70, which may be a pre-existing device in the vehicle 75, or which may be mounted on one of the wheels of the vehicle 75 or on a smaller wheel (not shown) that is held in place against the wheel of the vehicle 75, and generates pulses as the wheel rotates on the road surface 16. The frequency and phase of these pulses provide a precise measure of the wheel's rotation speed and direction, which can be used to trigger the image acquisition of the stereo line-scan cameras 20, 35 at fixed spatial intervals.

The process of generating and using the wheel encoder 70 pulses for camera triggering may involve, for example: (i) Pulse generation (266)—as the vehicle's wheel rotates on the road surface 15, the wheel encoder 70 may generate a series of electric pulses based on the angular position of the wheel, and the wheel encoder 70 may comprise a rotating disk or wheel with a pattern of alternating transparent and opaque sectors, and a fixed photoelectric sensor that detects the changes in light intensity as the disk rotates with the resulting output being a square wave signal with a frequency proportional to the wheel's rotation speed and a phase indicating the wheel's direction of motion, according to an embodiment herein; (ii) Edge detection (268)—the rising and falling edges of the wheel encoder pulses may then be detected using a microcontroller or a dedicated digital signal processing (DSP) unit or the processor 55, such that the rising edge may correspond to the transition from a low to a high voltage level, while the falling edge may correspond to the transition from a high to a low voltage level, and whereby the edge detection may be performed using hardware interrupts or timer-based polling, which allows the processor 55 or microcontroller, etc. to precisely measure the timing and duration of each pulse; (iii) Direction determination (270)—the detected rising and falling edges of the wheel encoder pulses may then be used to determine the direction of motion of the wheel, and this may be performed by comparing the relative timing or phase of the pulses from two separate output channels of the wheel encoder 70, known as the quadrature outputs, such that if the pulses from the two channels are 90 degrees out of phase, the direction of motion can be inferred from the lead or lag relationship between the channels; and (iv) Camera triggering (272)—the detected rising and falling edges of the wheel encoder pulses may then be used to trigger the image acquisition of the first and second stereo line-scan camera pairs 20, 35, and this may be performed by sending a hardware trigger signal from the processor 55 to the cameras 20, 35, which may initiate the exposure and readout of the cameras 20, 35, whereby the trigger signal may be synchronized with the wheel encoder pulses, such that the cameras 20, 35 may capture a new line of pixels at fixed spatial intervals along the road surface 16, regardless of the vehicle speed or acceleration. The spatial interval between successive camera triggers may be determined by the resolution of the wheel encoder 70 and the diameter of the wheel and can be adjusted to match the desired image overlap and resolution.

The software commands for generating and using the wheel encoder pulses for camera triggering may involve a combination of low-level hardware control and signal processing operations, as well as higher-level timing and synchronization functions. These commands may be implemented using specialized libraries and frameworks, which provide high-level abstractions and efficient implementations for various hardware interfacing and real-time processing tasks.

In addition to the basic wheel encoder 70 and camera triggering functions, the data acquisition and synchronization module may also implement various advanced features and capabilities, such as, for example: (i) Pulse interpolation—the module may use advanced signal processing techniques, such as pulse width modulation (PWM) or phase-locked loops (PLL), to interpolate the wheel encoder pulses and achieve sub-pulse resolution for camera triggering, which can help to reduce the quantization errors and improve the spatial accuracy of the image acquisition, especially at high vehicle speeds or low encoder resolutions; (ii) Slip detection—the module may use additional sensors, such as accelerometers or optical flow sensors, to detect and compensate for wheel slip or skidding during the image acquisition, which can help to ensure that the camera triggers remain synchronized with the actual motion of the vehicle, even in challenging road conditions or during sudden accelerations or decelerations; and (iii) Multi-camera synchronization—the module may use advanced synchronization techniques, such as hardware triggering or software time-stamping, to ensure that the images 30, 40 from the multiple stereo line-scan camera pairs 20, 35 are captured in a precise and consistent manner, which can help to reduce the errors and artifacts in the subsequent 3D reconstruction and stress analysis steps, and to enable the seamless integration and comparison of the data from different cameras 20, 35, 45 and sensors (such as the IMU 50).

Figure 8A:
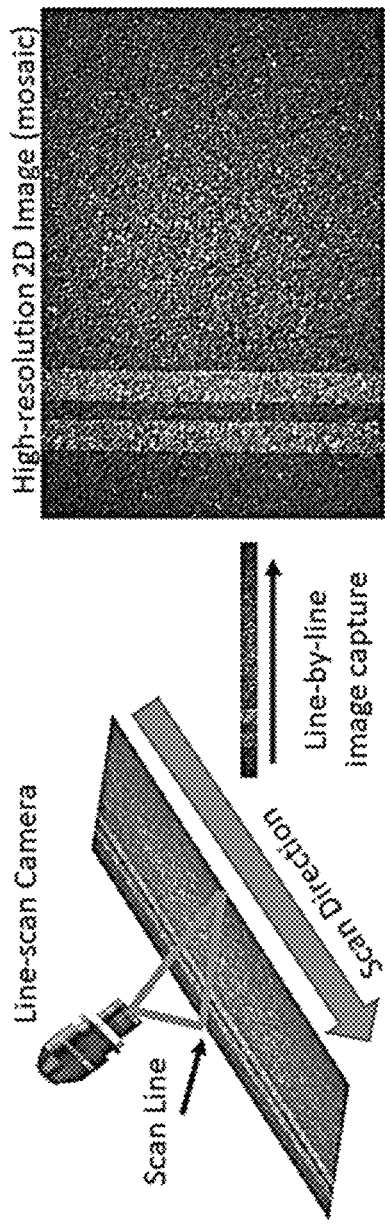
FIG. 8A is a schematic diagram illustrating a 2D image capturing process using a line-scan camera, according to an embodiment herein.
Figure 8B:
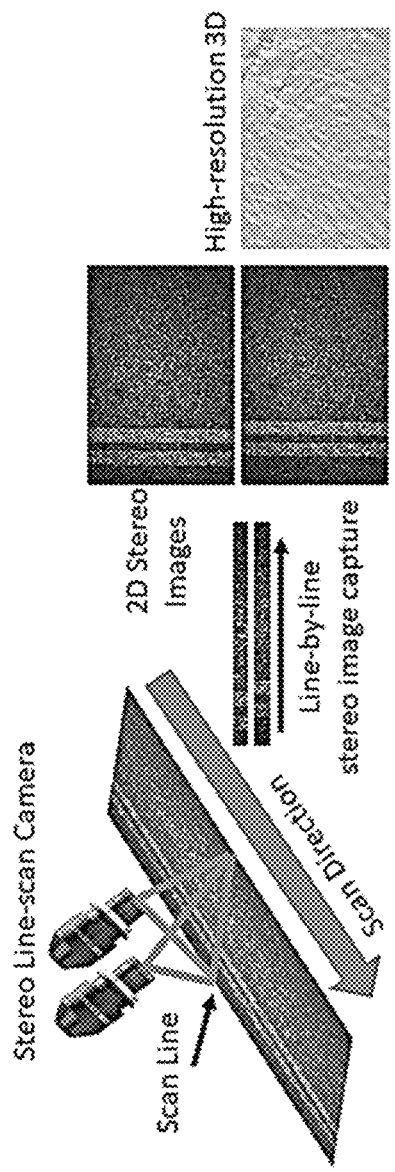
FIG. 8B is a schematic diagram illustrating a 3D image capturing process using a stereo line-scan camera, according to an embodiment herein.

In an example, the line-scan cameras 20, 35 operate on the principal of sacrificing resolution in 2-dimensions for very high resolution in 1 dimension (e.g. 7K pixels with 200 µm/pixel on a 1.4 meter scanline) and very high frame-rate (of the order of 30 kHz). To capture an image 30, 40, the cameras 20, 35 are smoothly moved over the road surface 16 to be imaged. If the motion occurs at the same rate that the images 30, 40 are acquired, they can be stored as sequential rows in an image, resulting in an arbitrarily high-resolution image as shown schematically in FIG. 8A, with reference to FIGS. 2 through 7M. These are also referred to as "pushbroom" cameras due to their steady "sweep" over the scene. The high-speed image acquisition of the line-scan cameras 20, 35 enables capturing high quality imagery (without motion blur) with vehicles/objects moving at speeds of up to 13 miles per hour. According to the embodiments herein, a stereo line-scan camera system is utilized comprising a pair of line-scan cameras 20, 35 to generate disparity maps and high-resolution depth images, which can be turned into point clouds, meshes, or other 3D representations 105 as shown in FIG. 8B, with reference to FIGS. 2 through 8A.

Detecting road deflections δ may require a 3D camera with a height resolution better than 0.05 mm. Accordingly, the line-scan stereo cameras 20, 35 can provide depth information at a very high resolution (height resolutions up to 0.55 micron and 2D resolution of up to 5 micron). Therefore, a cost-effective RWD system of two stereo-pairs 20, 35 (e.g., one on the trailing side and other on the leading side of a moving wheel load), can be used to accurately measure surface deflections δ of the road 15. Unlike, spot range sensors, the system 10 provided by the embodiments herein can produce rich 3D and 2D imagery (essentially a topographical output) of the road 15 as the tire drives over the road 15, which can be used for visualizations, in-depth analysis of surface condition, and longitudinal analysis using historic data. Moreover, the system 10, which is embodied as a RWD system, can be installed on most any vehicle 75 and therefore can be used for a wide variety of applications.

Figure 9A:
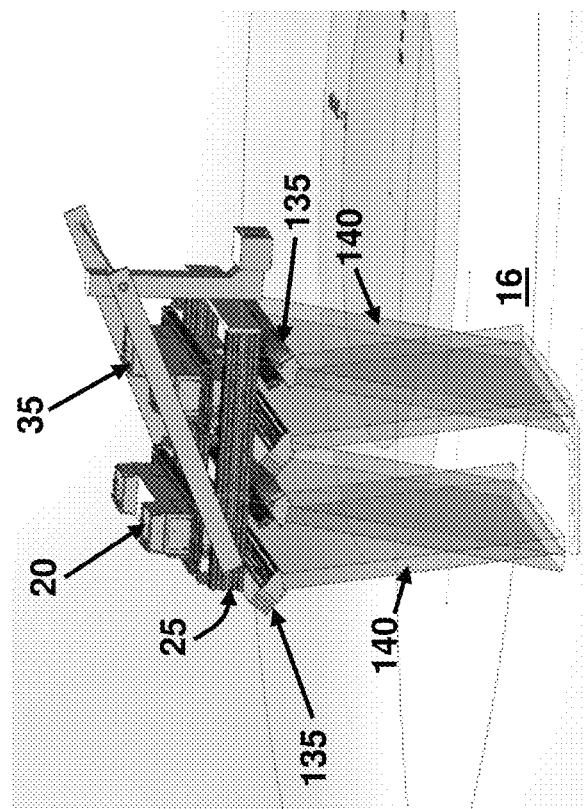
FIG. 9A is a schematic diagram illustrating a sensor rig with a pair of stereo line-scan cameras, according to an embodiment herein.
Figure 9B:
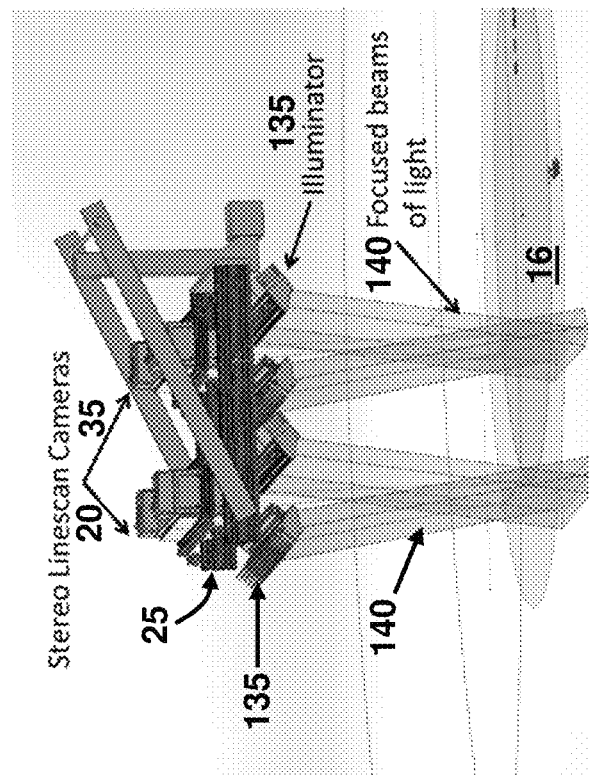
FIG. 9B is a schematic diagram illustrating another view of a sensor rig with a pair of stereo line-scan cameras, according to an embodiment herein.
Figure 10:
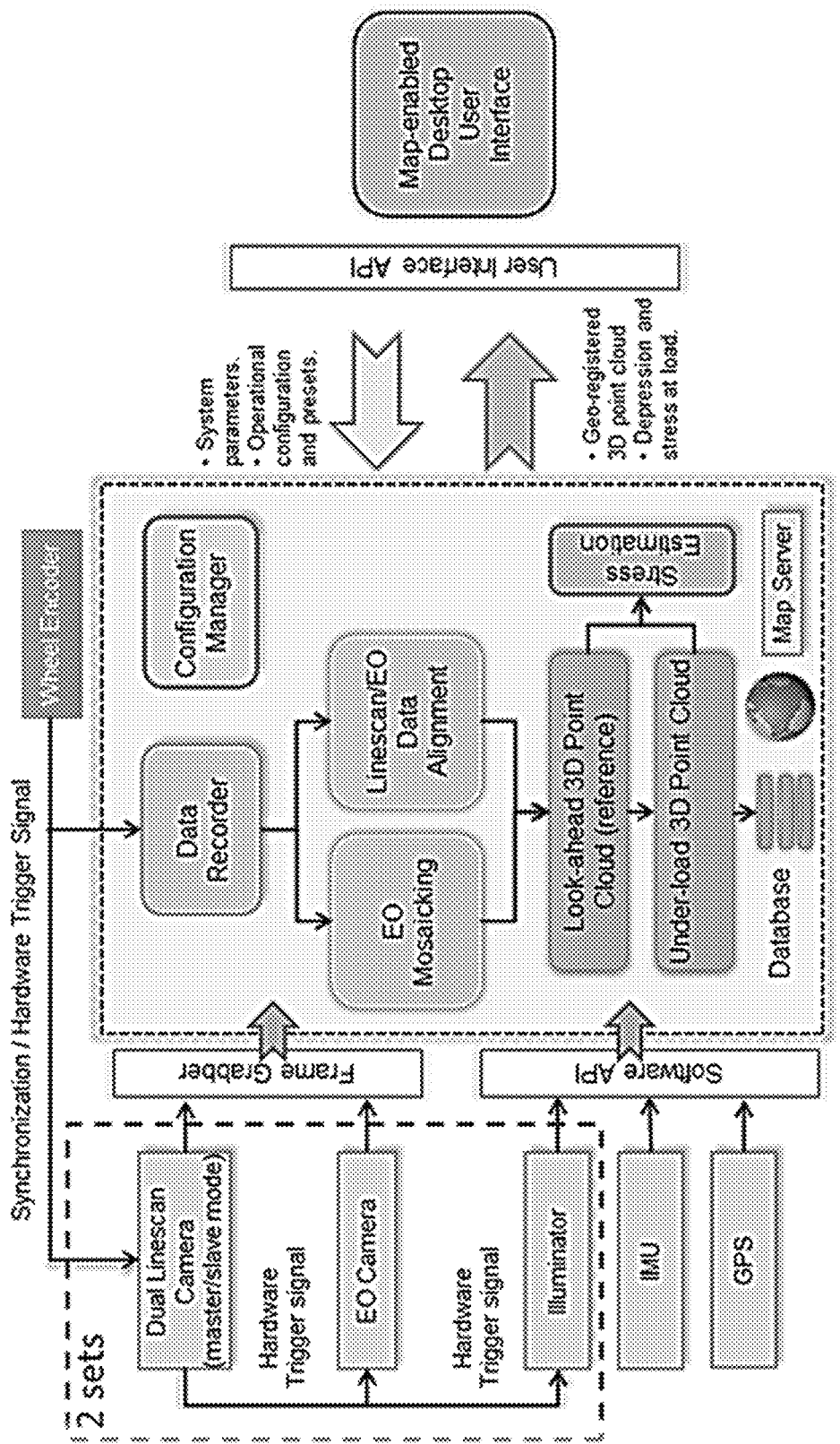
FIG. 10 is a block diagram illustrating a software system, according to an embodiment herein.
Figure 11:
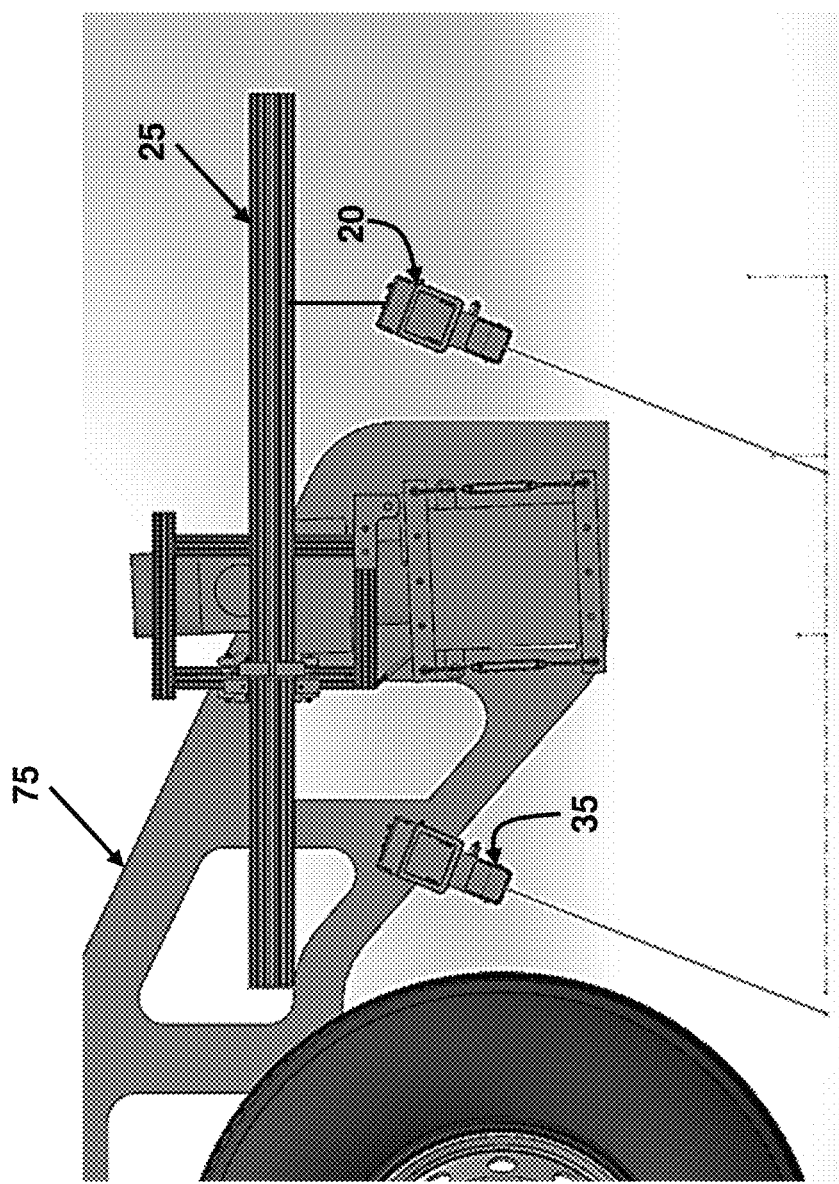
FIG. 11 is a schematic diagram illustrating the sensor rig attached to a horizontal beam, according to an embodiment herein.
Figure 12:
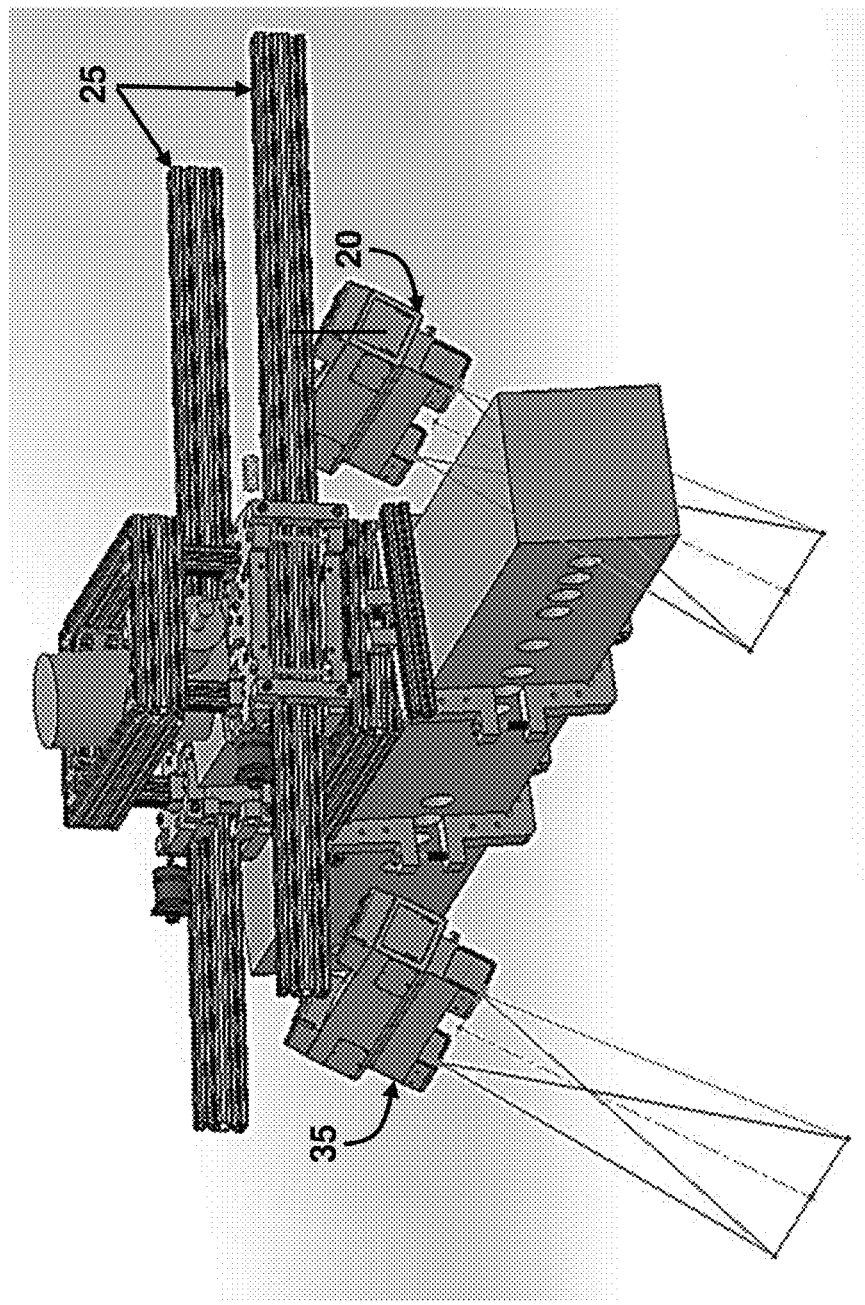
FIG. 12 is a schematic diagram illustrating a side view of the camera mounting rig, according to an embodiment herein.
Figure 13:
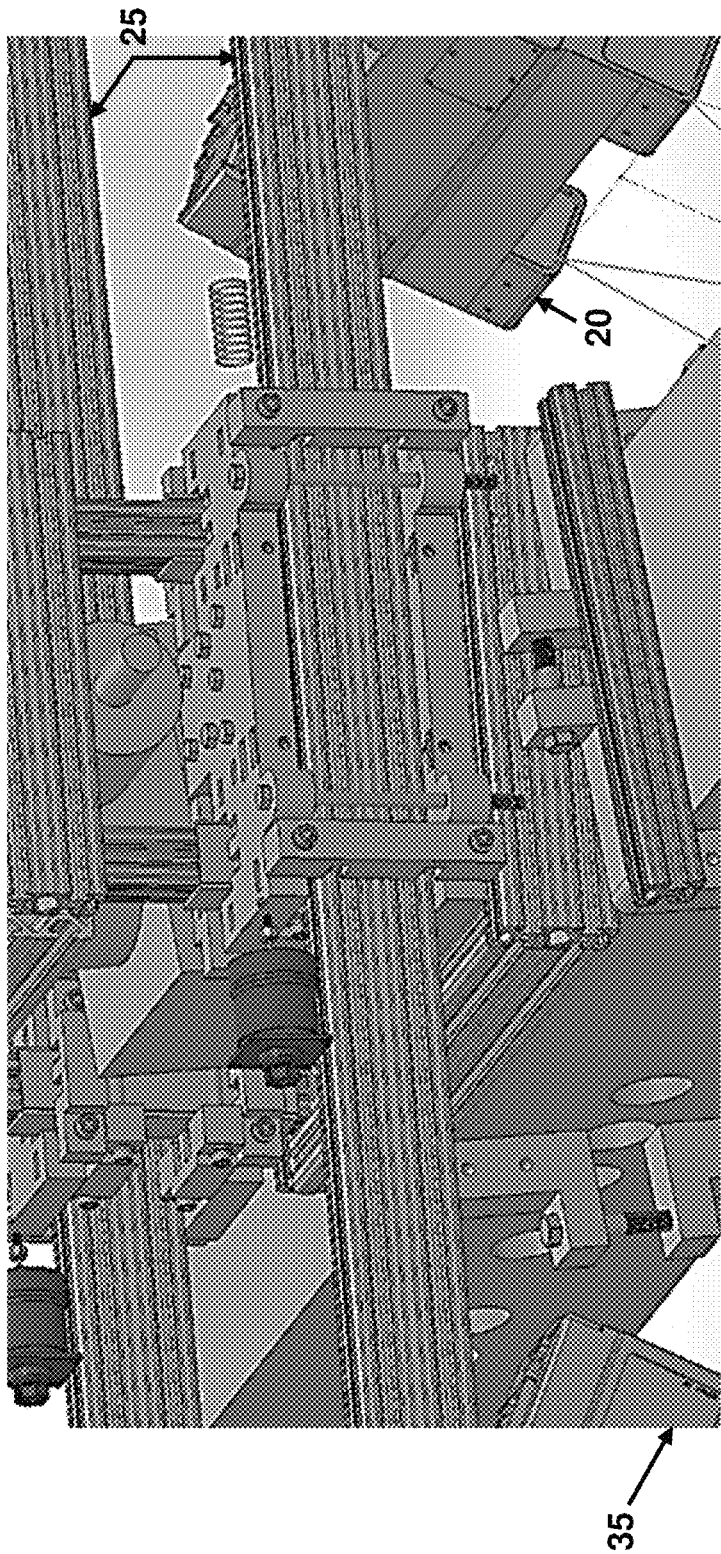
FIG. 13 is a schematic diagram illustrating plates used on the rails of the sensor rig, according to an embodiment herein.
Figure 14:
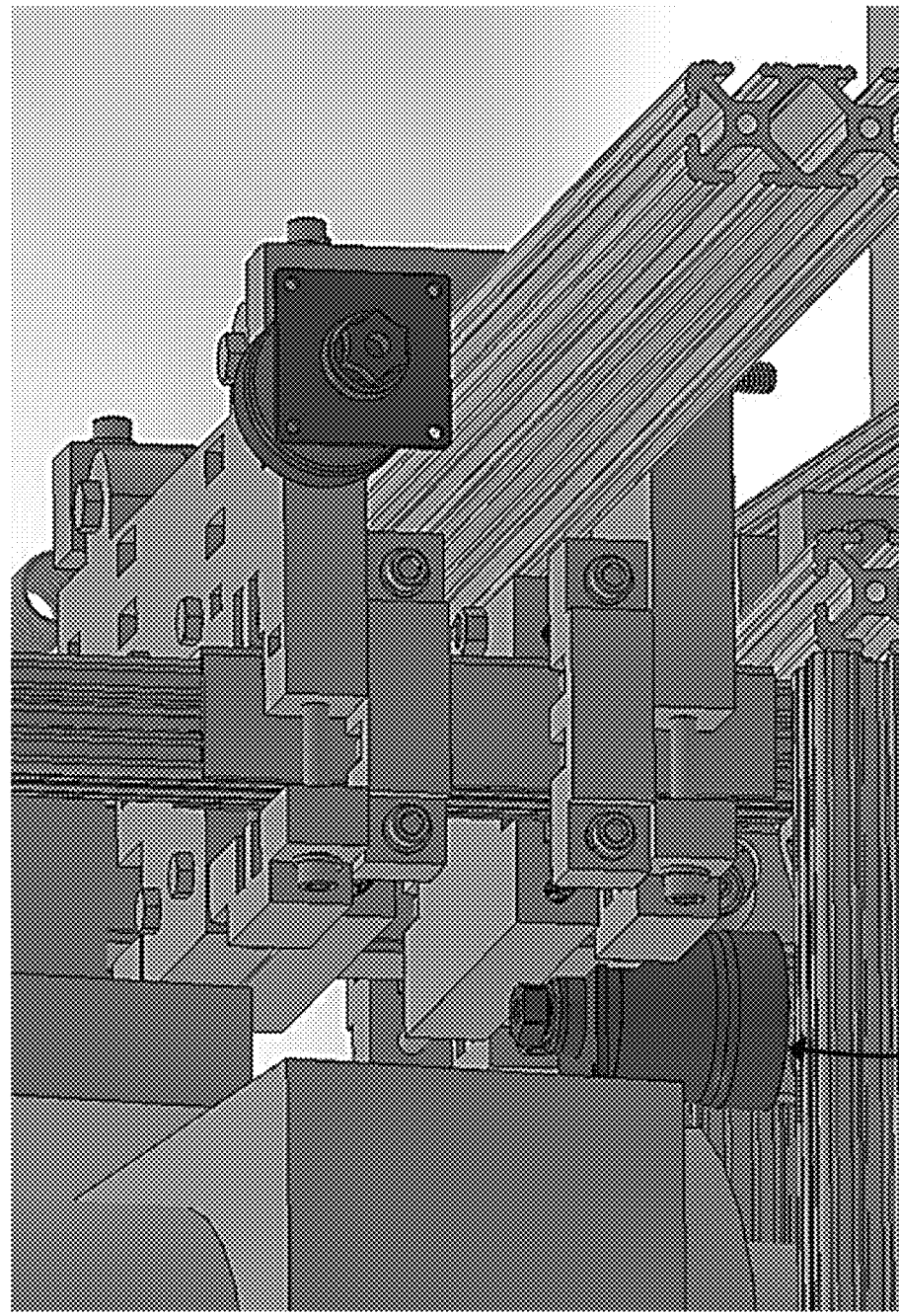
FIG. 14 is a schematic diagram illustrating a vibration dampening system, according to an embodiment herein.

FIGS. 9A and 9B, with reference to FIGS. 2 through 8B, illustrate schematic diagrams of the sensor setup with two stereo line scan cameras 20, 35 mounted on a sensor rig 25 to scan the asphalt (e.g., road surface 16). At least two illuminators 135 may be used to provide highly focused beams of light 140 on the road surface 16 to help generate higher quality imagery of the road surface 16. FIG. 10, with reference to FIGS. 2 through 9B, shows the system design that ingests line-scan/EO sensor data, GPS, IMU and wheel encoder data streams, performs data processing with onboard GUPs and extracts 3D point cloud representation of the road surface 16. In an example, the software architecture is modular and incorporates standard and customized software APIs to ingest raw sensor data 85. FIGS. 11-14, with reference to FIGS. 2 through 10, illustrate the sensor rig 25 as being modular to enable the sensor rig 25 to be mounted on any heavy vehicle 75. Dampening of vibrations in sensor rig 25 is achieved by a spring mass damper system 130 that incorporates the use of dashpots for precision dampening as shown in FIG. 14.

Figure 15:
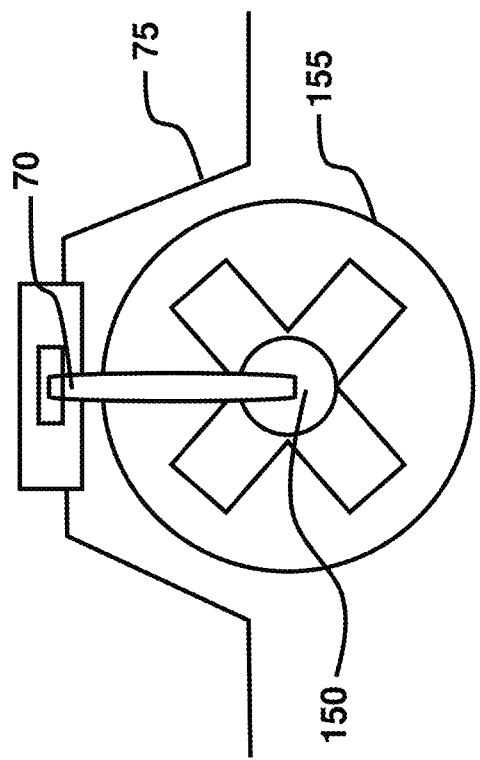
FIG. 15 is a schematic diagram illustrating a wheel encoder attached to the wheel of a vehicle, according to an embodiment herein.

The system 10 may use a hardware signal for synchronization of sensor data capture using the wheel encoder 70 attached to the hub 150 of a wheel 15 of a vehicle 75 as shown in FIG. 15, with reference to FIGS. 2 through 14. The wheel encoder 70 may generate more than 5,000 pulses per rotation, in an example. Moreover, the system 10 is configured to increase the triggering resolution by using the line-scan camera's built-in frequency upscaling method and via software fixes to the controller (e.g., processor 55). The system 10 uses the wheel encoder signal to trigger one-scanline capture from the line-scan cameras 20, 35. In addition, the system 10 may generate two more signals including (i) frame capture for the line-scan camera 20, 35 that comprise a specific number of rows (for example, 1000 lines), and (ii) EO capture signal. In an example, a hardware frequency divider may be utilized that receives pulses from the wheel encoder 70 and generates pulses for line-scan frame and EO sensors.

Figure 16:
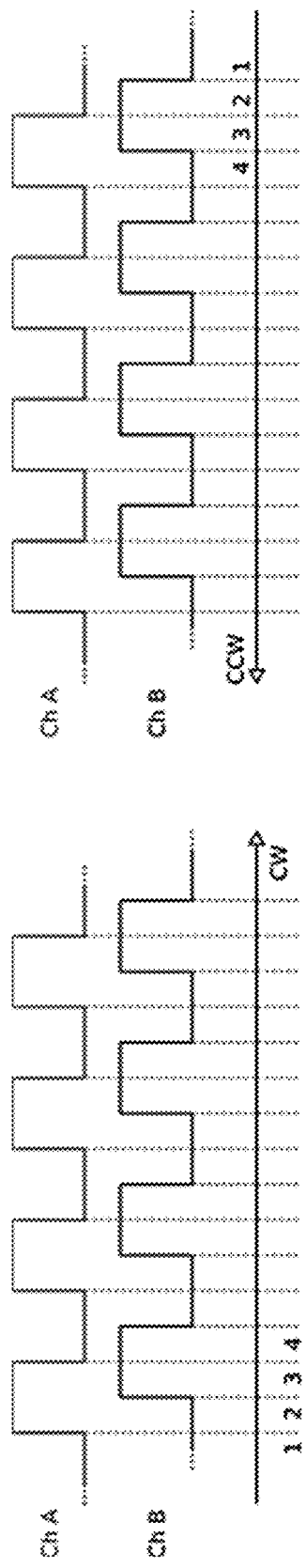
FIG. 16 is a waveform diagram illustrating signals generated by outputs of the wheel encoder, according to an embodiment herein.
Figure 18:
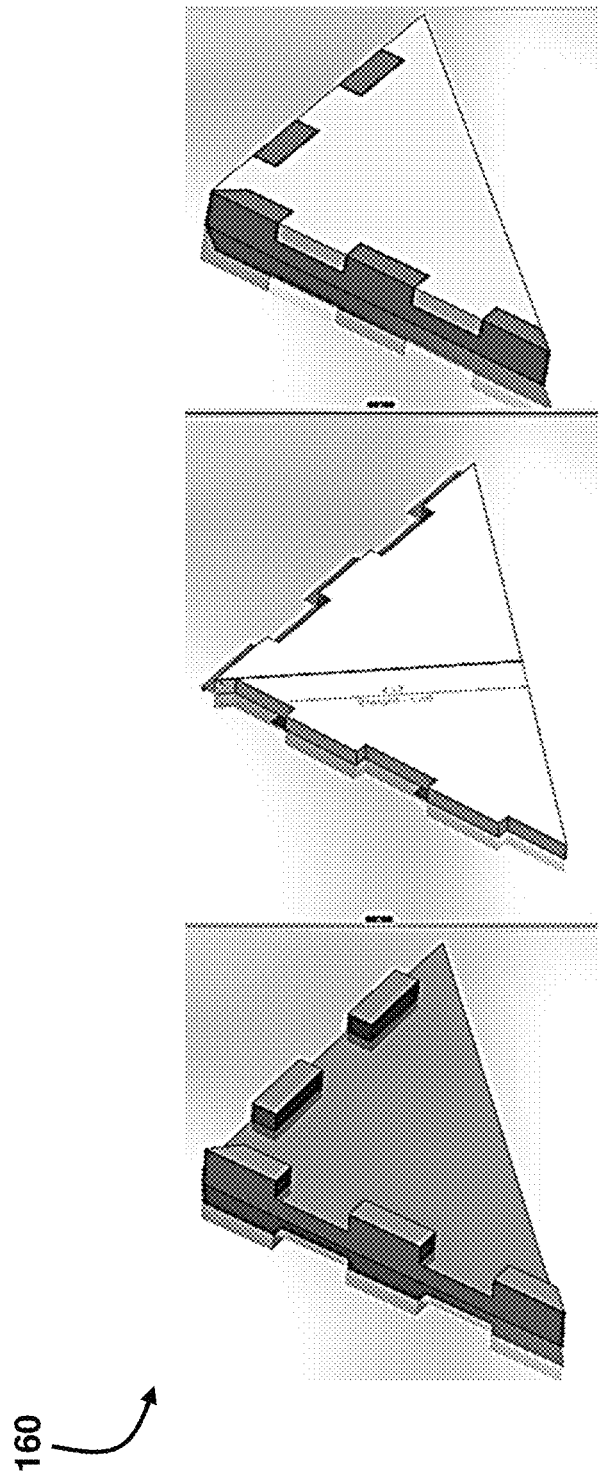
FIG. 18 is a schematic diagram illustrating EO/line-scan camera calibration patterns, according to an embodiment herein.

The triggering software is also configured to be robust to noise and to increase the sensor data capture frame rate. Instead of using the logic level of the wheel encoder 70 (high or low), the embodiments herein detect the edges of the input pulses on the interrupt inputs on the frequency divider. Software checks may also be added to handle debouncing that may cause overlapping line-scan capture. FIG. 16, with reference to FIGS. 2 through 15, illustrates the pulse generated by the two encoder outputs when the wheel 155 is moved clockwise and counterclockwise directions respectively, according to an example. As indicated in FIG. 16, if the pulses from the two channels are 90 degrees out of phase, the direction of motion can be inferred from the lead or lag relationship between the channels. For example, if channel A leads channel B, the wheel 155 is rotating forward, while if channel B leads channel A, the wheel 155 is rotating backward. This approach uses the rising or falling edges of the signal, it is much more efficient in counting the pulses and can also identify the forward or backward motion accordingly. As seen from FIG. 16, there are 8 different types of transitions, labeled as A and B. Instead of comparing the value of each bit, a lookup table is provided that can perform the calculation in a single instruction, as shown as FIG. 17, with reference to FIGS. 2 through 16. For testing purposes, a 3D calibration pattern 160 may be used to estimate the relationship between the line-scan cameras 20, 35 and EO camera 45, as shown in FIG. 18, with reference to FIGS. 2 through 17. Experimentally, this pattern 160 was used before each dataset collection to minimize any errors that may occur due to vehicle vibration between data collection scenarios.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 19:
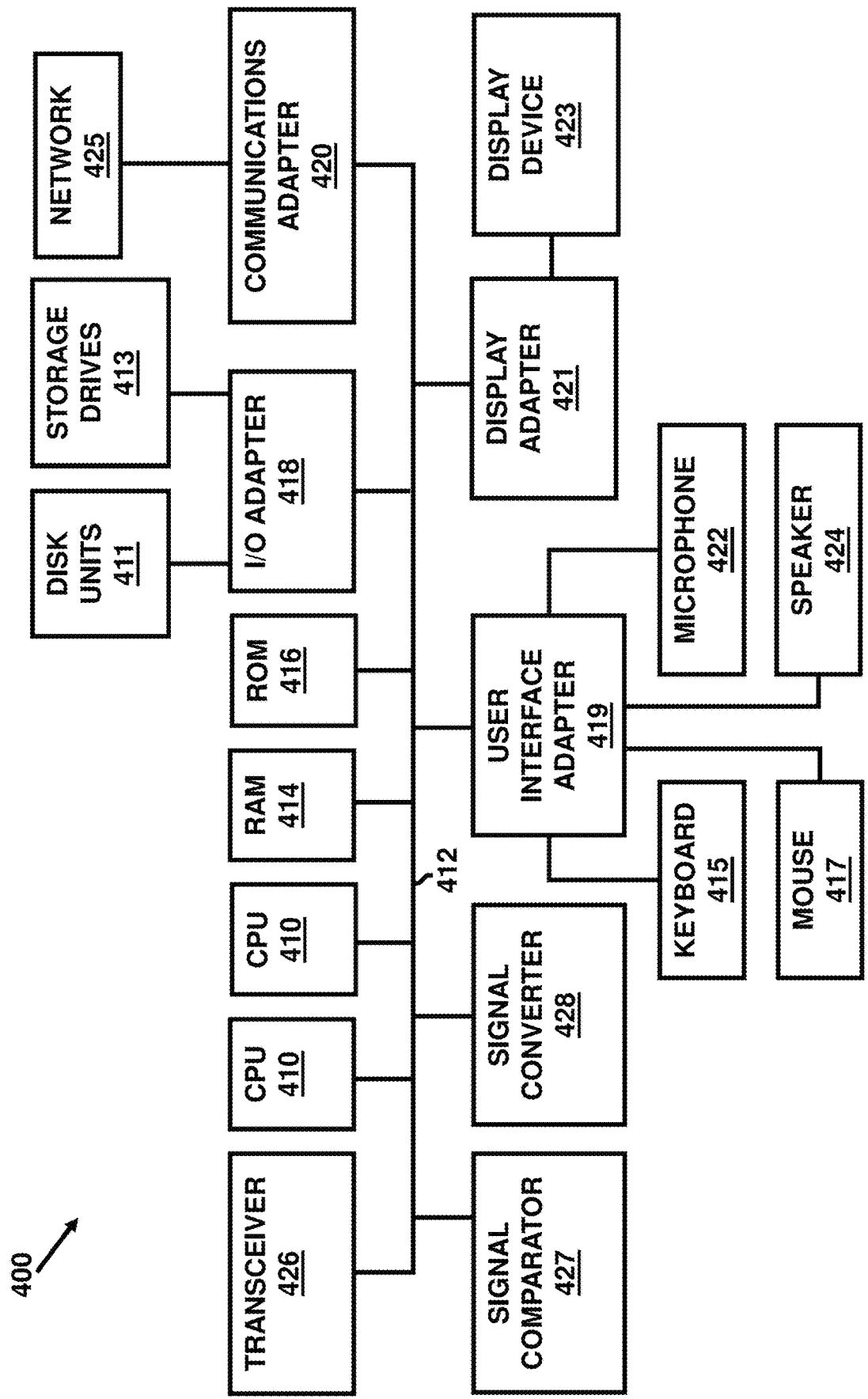
FIG. 19 is a block diagram illustrating a computer system used in accordance with the embodiments herein.

A representative hardware environment for practicing the embodiments herein is depicted in FIG. 19, with reference to FIGS. 2 through 18, according to an example. This schematic example drawing illustrates a hardware configuration of an information handling/computer system 400 in accordance with the embodiments herein. For example, the system 400 comprises at least one processor or central processing unit (CPU) 410. The CPUs 410 may be interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system 400. The system 400 can read the inventive instructions on the program storage devices and follow these instructions to execute the methodology of the embodiments herein. The system 400 may further include a user interface adapter 419 that connects a keyboard 415, mouse 417, speaker 424, microphone 422, and/or other user interface devices such as a touch screen device (not shown) to the bus 412 to gather user input. Additionally, a communication adapter 420 may connect the bus 412 to a data processing network, and a display adapter 421 may connect the bus 412 to a display device 423, which may be embodied as an output device such as a monitor, printer, or transmitter, for example. Further, a transceiver 426, a signal comparator 427, and a signal converter 428 may be connected with the bus 412 for processing, transmission, receipt, comparison, and conversion of electric or electronic signals.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system for measuring surface deflection of a road, the system comprising:
    a first stereo line-scan camera pair mounted on a sensor rig, wherein the first stereo line-scan camera pair captures a first set of 3D images of a road surface;
    a second stereo line-scan camera pair mounted on the sensor rig, wherein the second stereo line-scan camera pair captures a second set of 3D images of the road surface, and wherein the second stereo line-scan camera pair is positioned at a predetermined distance from the first stereo line-scan camera pair;
    at least one digital electro-optical (EO) camera that generates images and is rigidly attached to the sensor rig;
    an inertial measurement unit (IMU) to detect inertial forces acting upon the sensor rig; and
    a processor to:
        compensate for acceleration and vibration effects upon the sensor rig, wherein the processor utilizes imagery from the EO camera and inertial measurements from the IMU to produce 2D mosaics and 3D reconstructions of the road surface from the first and second sets of 3D images; and
        calculate the surface deflection of the road based on the first and second sets of 3D images.

2. The system of claim 1, comprising a wheel encoder that measures displacement of a vehicle on which the sensor rig is mounted, wherein the processor is to compensate for vehicle displacement using measurements from the wheel encoder.

3. The system of claim 1, further comprising:
    a sensor interface module that receives raw sensor data from the first and second stereo line-scan camera pairs, the at least one EO camera, the IMU, and a GPS receiver;

a pre-processing module that performs data processing on the raw sensor data using the processor;

a 3D reconstruction module that extracts a 3D representation of the road surface from the processed sensor data; and a deflection measurement module that calculates the surface deflection based on the 3D representation.

4. The system of claim 3, further comprising:

a data synchronization module that synchronizes the raw sensor data received by the sensor interface module; and a visualization module that generates visualizations of the 3D representation of the road surface and the calculated surface deflection.

5. The system of claim 4, further comprising a user interface that outputs the visualizations of the 3D representation of the road surface and the calculated surface deflection.

6. The system of claim 1, wherein the sensor rig comprises a vibration dampening system.

7. The system of claim 1, further comprising a pair of illuminators that provide focused beams of light for the first and second stereo line-scan camera pairs to capture images of the road.

8. A method for measuring surface deflection of a road, the method comprising:

positioning a first stereo line-scan camera pair to capture a first set of 3D images of a road surface without a load thereon;

positioning a second stereo line-scan camera pair at a distance from the first stereo line-scan camera pair to capture a second set of 3D images of the road surface with a load thereon;

capturing imagery of the road surface with at least one digital electro-optical (EO) camera rigidly attached to the sensor rig;

measuring inertial data with an inertial measurement unit (IMU);

compensating for acceleration and vibration effects using the imagery from the EO camera and the inertial data from the IMU to produce 2D mosaics and 3D reconstructions of the road surface from the first and second sets of 3D images; and calculating the surface deflection of the road based on the first set of 3D images without the load and the second set of 3D images with the load.

9. The method of claim 8, further comprising:

receiving raw sensor data from the first and second stereo line-scan camera pairs, the at least one EO camera, the IMU, and a GPS receiver;

performing data processing on the raw sensor data;

extracting a 3D representation of the road surface from processed sensor data; and calculating the surface deflection based on the 3D representation.

10. The method of claim 9, wherein performing data processing on the raw sensor data comprises:

performing image correction on the raw sensor data from the first and second stereo line-scan camera pairs and the at least one EO camera;

performing image rectification on the corrected sensor data; and performing depth estimation using the rectified sensor data to generate a set of depth maps.

11. The method of claim 10, wherein extracting the 3D representation of the road surface comprises:

performing point cloud generation using the set of depth maps;

performing point cloud filtering on the generated point cloud; and performing surface reconstruction using the filtered point cloud to generate the 3D representation of the road surface.

12. The method of claim 11, further comprising performing sensor fusion using the raw sensor data from the IMU and the GPS receiver to generate synchronized pose data.

13. The method of claim 12, further comprising performing point cloud registration using the synchronized pose data to align the generated point cloud.

14. The method of claim 8, further comprising storing the raw sensor data and the processed sensor data using a data recorder.

15. The method of claim 8, further comprising managing system settings and parameters for the sensor interface module, the pre-processing module, and the 3D reconstruction module using a configuration manager.

16. The method of claim 8, further comprising performing EO mosaicking to create a mosaic image from the raw sensor data captured by the at least one EO camera.

17. The method of claim 8, further comprising performing line-scan/EO data alignment to align the raw sensor data from the first and second stereo line-scan camera pairs with the raw sensor data from the at least one EO camera.

18. The method of claim 8, wherein extracting the 3D representation of the road surface comprises generating a look-ahead 3D point cloud using the raw sensor data from the first stereo line-scan camera pair and an under-load 3D point cloud using the raw sensor data from the second stereo line-scan camera pair.

19. The method of claim 18, further comprising estimating stress on the road surface based on the look-ahead 3D point cloud and the under-load 3D point cloud.

20. The method of claim 8, further comprising:

generating electric pulses based on rotation of a wheel positioned on the road using a wheel encoder, detecting rising and falling edges of the pulses generated by outputs of the wheel encoder;

determining a direction of motion of the wheel based on the detected rising and falling edges of the pulses; and triggering the first and second stereo line-scan camera pairs to capture the first and second sets of 3D images based on the detected rising and falling edges of the pulses.

* * * * *